(12) United States Patent
Goto et al.

(10) Patent No.: US 8,797,480 B2
(45) Date of Patent: Aug. 5, 2014

(54) LIGHT GUIDE PLATE, SURFACE LIGHT SOURCE DEVICE, AND DISPLAY DEVICE

(75) Inventors: Masahiro Goto, Mihara (JP); Hiroshi Sekiguchi, Tokyo-to (JP); Hiroshi Yamamoto, Kawaguchi (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 160 days.

(21) Appl. No.: 13/275,593

(22) Filed: Oct. 18, 2011

(65) Prior Publication Data

US 2013/0093980 A1 Apr. 18, 2013

(51) Int. Cl.
*G02B 6/00* (2006.01)

(52) U.S. Cl.
USPC .............................................. 349/62; 349/65

(58) Field of Classification Search
CPC .......... G02F 2201/06; G02F 2001/011; G02F 2001/0113; G02F 1/0134; G02F 1/01708; G02F 1/025; G02F 1/035; G02F 1/0508; G02F 1/0553; G02F 1/065; G02F 1/073; G02F 1/095; G02F 1/125; G02F 1/1326
USPC ...................................................... 349/62, 65
See application file for complete search history.

(56) References Cited

U.S. PATENT DOCUMENTS

| | | | |
|---|---|---|---|
| 6,576,887 B2 * | 6/2003 | Watson et al. ............ | 250/227.11 |
| 7,001,060 B1 * | 2/2006 | Kimura .......................... | 362/620 |
| 7,226,197 B2 * | 6/2007 | Hayashi et al. ............... | 362/608 |
| 8,506,106 B2 * | 8/2013 | Kim et al. ..................... | 362/97.1 |
| 2004/0120139 A1 | 6/2004 | Kunimochi et al. | |
| 2005/0094295 A1 * | 5/2005 | Yamashita et al. ............ | 359/833 |
| 2005/0248960 A1 * | 11/2005 | Yamashita et al. ............ | 362/611 |
| 2005/0254259 A1 * | 11/2005 | Yamashita et al. ............ | 362/621 |
| 2007/0223252 A1 * | 9/2007 | Lee et al. ....................... | 362/615 |
| 2008/0297459 A1 * | 12/2008 | Sugimoto et al. ............. | 345/102 |
| 2009/0135623 A1 * | 5/2009 | Kunimochi ..................... | 362/608 |
| 2010/0053502 A1 * | 3/2010 | Kim et al. ........................ | 349/64 |
| 2010/0328576 A1 * | 12/2010 | Kinoshita ........................ | 349/62 |
| 2011/0026239 A1 * | 2/2011 | Kim et al. ..................... | 362/97.1 |
| 2011/0242847 A1 * | 10/2011 | Greener et al. ............... | 362/619 |
| 2011/0242850 A1 * | 10/2011 | Lei et al. ........................ | 362/628 |
| 2011/0242851 A1 * | 10/2011 | Landry et al. ................. | 362/628 |

FOREIGN PATENT DOCUMENTS

| | | |
|---|---|---|
| JP | 2004-200072 A1 | 7/2004 |
| JP | 2004-226503 A1 | 8/2004 |
| JP | 2005-347208 A1 | 12/2005 |
| JP | 2006-134750 A1 | 5/2006 |
| JP | 2009-199927 A1 | 9/2009 |
| WO | 2008/032775 A1 | 3/2008 |

OTHER PUBLICATIONS

Japanese Office Action (Application No. 2010-135955) dated Jan. 10, 2014.

* cited by examiner

*Primary Examiner* — Kaveh Kianni
(74) *Attorney, Agent, or Firm* — Burr & Brown, PLLC

(57) ABSTRACT

A light guide plate includes a body portion, and a plurality of unit shaped elements defining a light exit surface and arranged on one-side surface of the body portion side by side in an arrangement direction intersecting a light guide direction. Each unit shaped element extends in a direction intersecting the arrangement direction. A light exit surface angle θa, which is the angle of the contour of each unit shaped element with respect to the one-side surface, is more than 10° and not more than 30° in a zone of the contour of each unit shaped element, the width of the zone along the arrangement direction being not less than 35% and not more than 70% of the full width of the unit shaped element.

11 Claims, 15 Drawing Sheets

LIGHT GUIDE PLATE, SURFACE LIGHT SOURCE DEVICE, AND DISPLAY DEVICE

CROSS-REFERENCE TO RELATED APPLICATION

The disclosure of Japanese Patent Application No. 2010-135955, filed on Jun. 15, 2010, is incorporated herein by reference in its entirety.

BACKGROUND OF THE INVENTION

1. Field of the Invention

The present invention relates to a light guide plate having a light exit surface, a back surface that opposes the light exit surface, and a light entrance surface comprised of at least part of a side surface between the light exit surface and the back surface, and more particularly to a light guide plate which can obscure in-plane variation of brightness in an area of a light emitting surface (display surface), lying in the vicinity of the light entrance surface that faces a light source. The present invention also relates to a surface light source device including the light guide plate, and to a display device including the surface light source device as a backlight.

2. Description of the Related Art

A surface light source device having a two-dimensional light emitting surface is in widespread use, for example, as a backlight which is incorporated in a liquid crystal display device and illuminates a liquid crystal display panel from the back (see e.g. JP 2004-226503A). Surface light source devices for liquid crystal display devices are roughly classified into direct-light type devices which have a light source disposed right behind an optical member, and edge-light type devices (also called side-light type devices) which have a light source disposed lateral to an optical member.

Edge-light type surface light source devices have a structural feature that enables design of thin surface light sources as compared to direct-light type surface light source devices. Because of the structural feature, edge-light type surface light source devices have heretofore been applied principally in display devices for laptop personal computers (PCs).

Nowadays, with the development of light sources that emit light with high linearity, as typified by a light emitting diode, edge-light type surface light source devices have been put into use also in display devices having a larger size than laptop PCs, for example home televisions. However, it has turned out that when an array of light emitting diodes (LEDs) is used as a light source, in-plane variation of brightness (more precisely luminance) is produced in an area of a display surface (light emitting surface), lying in the vicinity of a light entrance surface that faces the light source. More specifically, in the area of the display surface (light emitting surface), lying in the vicinity of the light entrance surface, a pattern of alternating bright and dark portions is formed along the LED arrangement direction at the same pitch as the pitch of the array of LEDs.

It has also turned out that the in-plane variation of brightness is marked when a light guide plate is used which has linear prisms extending in the light guide direction and provided on the light exit side. In particular, when a light guide plate with prisms is used, in-plane variation of brightness is observed in a larger area of a display surface (light emitting surface).

It is expected that as the emission intensity of LED is improved in the future, a decreased number of LEDs will be arranged with a wider spacing in a light source in order to reduce the cost of the display device. It is, therefore, possible that the above-described in-plane variation of brightness may be observed more clearly in a wider area of a display surface (light emitting surface).

SUMMARY OF THE INVENTION

The present invention has been made in view of the above situation in the related art. It is therefore an object of the present invention to provide a light guide plate, a surface light source device and a display device which can obscure in-plane variation of brightness in an area of a display surface (light emitting surface), lying in the vicinity of a light entrance surface that faces a light source.

In order to achieve the object, the present invention provides a light guide plate comprising:
a light exit surface;
a back surface opposed to the light exit surface;
at least one light entrance surface consisting of part of a side surface between the light exit surface and the back surface; and
a counter surface consisting of part of the side surface and opposed to the one light entrance surface in a first direction,
said light guide plate comprising:
a body portion; and
unit shaped elements defining the light exit surface, the unit shaped elements being arranged on one-side surface of the body portion in an arrangement direction intersecting the first direction,
wherein each unit shaped element extending in a direction intersecting the arrangement direction, and
wherein in a main cross-section parallel to both the arrangement direction and a normal direction of the one-side surface of the body portion, a light exit surface angle, which is an angle of a contour of each unit shaped element with respect to the one-side surface of the body portion, is more than 10° and not more than 30° in a zone of the contour of each unit shaped element, a width of the zone along the arrangement direction being not less than 35% and not more than 70% of a full width of the unit shaped element.

Those expressions as used in the specification and the claims with reference to the main-cross section e.g. the expression "in a main cross-section parallel to both the arrangement direction and a normal direction of the one-side surface of the body portion, a light exit surface angle, which is an angle of a contour of each unit shaped element (or a light exit-side surface of each groove) with respect to the one-side surface of the body portion, is more than 10° and not more than 30° in a zone of the contour (or a light exit side surface) of each unit shaped element (or each groove), a width of the zone along the arrangement direction being not less than 35% and not more than 70% of a full width of the unit shaped element (or groove)", do not necessarily mean that the conditions described therein are to be satisfied, e.g. by the unit shaped element (groove), in the main cross-section at every position in the first direction.

In a preferred embodiment of the light guide plate according to the present invention, the light exit surface angle of the unit shaped element increases with distance from a top of the contour of the unit shaped element, i.e. the farthest point from the body portion toward an end of the contour of the unit shaped element, i.e. the nearest point to the body portion.

In a preferred embodiment of the light guide plate according to the present invention, the light exit surface angle is more than 10° and not more than 60° in the entire contour of the unit shaped element in the main cross-section.

In a preferred embodiment of the light guide plate according to the present invention, the light exit surface angle is more than 30° and not more than 60° in a zone of the contour of the unit shaped element, the width of the zone along the arrangement direction being not less than 30% and not more than 65% of the full width of the unit shaped element.

In a preferred embodiment of the light guide plate according to the present invention, in the main cross-section of the light guide plate, a ratio of a height H of each unit shaped element from the one-side surface of the body portion relative to a width W of the unit shaped element in the arrangement direction (H/W) is not less than 0.2 and not more than 0.4.

In a preferred embodiment of the light guide plate according to the present invention, the unit shaped elements each have, in the main cross-section, a pentagonal shape whose one side lies on the one-side surface of the body portion and whose two sides lie between a top and each end of the contour, or a shape in which one or more of the corners of the polygonal shape are chamfered, and of said two sides lying between the top, the farthest point from the one-side surface, and each end, connecting to the one-side surface, of the contour, the top-side side has a light exit surface angle of more than 10° and not more than 30°, and the end-side side has a light exit surface angle of more than 30° and not more than 60°.

In a preferred embodiment of the light guide plate according to the present invention, the body portion has a resin matrix and a diffusing component dispersed in the matrix.

In the light guide plate according to the present invention, the unit shaped elements may be configured either as unit shaped elements projecting from the one-side surface of the body portion or as grooves formed in the body portion.

The present invention also provides a surface light source device comprising:

any one of the above-described light guide plates according to the present invention; and a light source disposed so as to face the light entrance surface of the light guide plate.

In a preferred embodiment of the surface light source device according to the present invention, the one light entrance surface of the light guide plate serves as a first light entrance surface and the counter surface of the light guide plate serves as a second light entrance surface, and the light source includes a first light source disposed so as to face the first light entrance surface, and a second light source disposed so as to face the second light entrance surface.

In a preferred embodiment of the surface light source device according to the present invention, the light source includes a plurality of point-like light emitters arranged so as to face the light entrance surface of the light guide plate.

The present invention also provides a display device comprising:

any one of the above-described surface light source devices according to the present invention; and a liquid crystal display panel disposed so as to face the surface light source device.

In a preferred embodiment of the present invention, the display device further comprises a controller, the light source includes point-like light emitters arranged so as to face the light entrance surface of the light guide plate, and the controller is configured to control an output of each point-like light emitter, and adjust the output of each point-like light emitter according to an image to be displayed.

The present invention makes it possible to obscure in-plane variation of brightness in an area of a display surface (light emitting surface), lying in the vicinity of a light entrance surface that faces a light source.

DETAILED DESCRIPTION OF THE INVENTION

Figure 1:
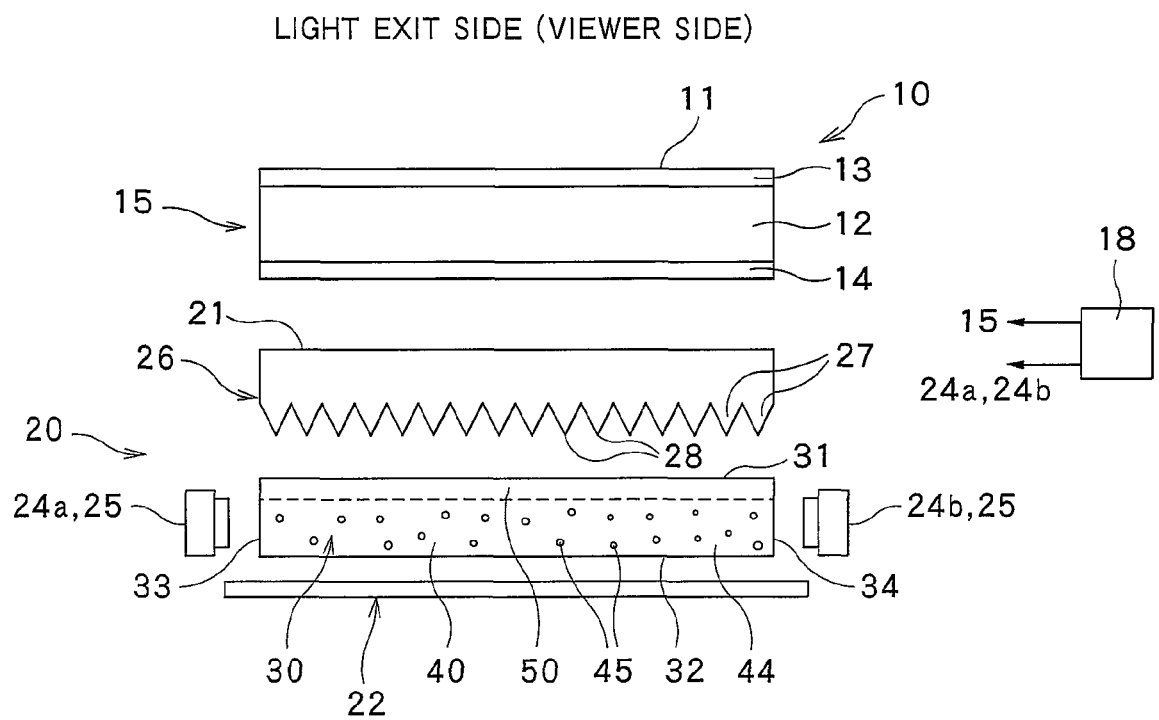
FIG. 1 is a diagram illustrating an embodiment of the present invention, being a cross-sectional view showing the schematic construction of a display device and a surface light source device.

Preferred embodiments of the present invention will now be described with reference to the drawings. In the drawings attached to the present specification, for the sake of illustration and easier understanding, scales, horizontal to vertical dimensional ratios, etc. are exaggeratingly modified from those of the real things.

Figure 2:
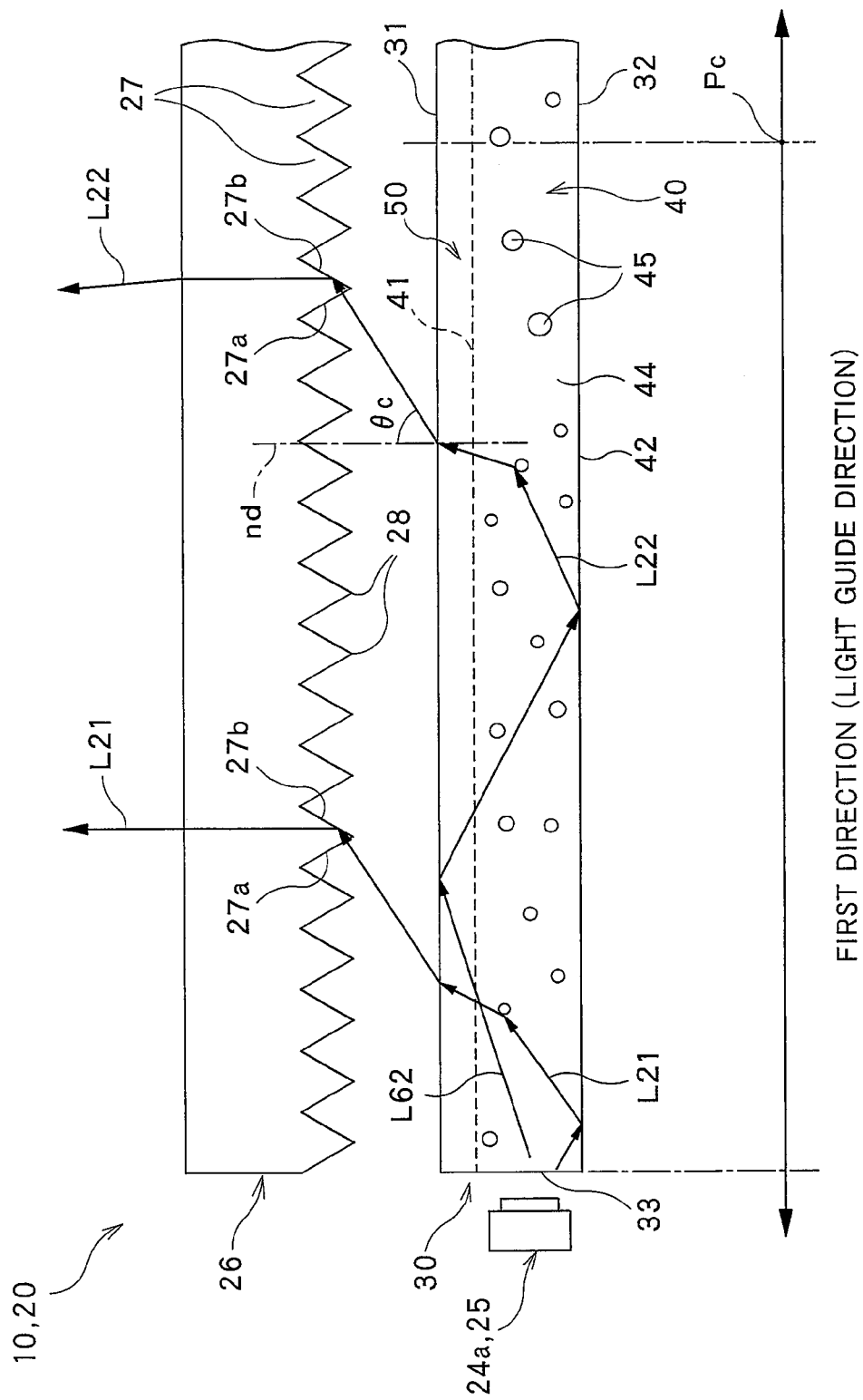
FIG. 2 is a diagram illustrating the action of the surface light source device of FIG. 1.
Figure 3:
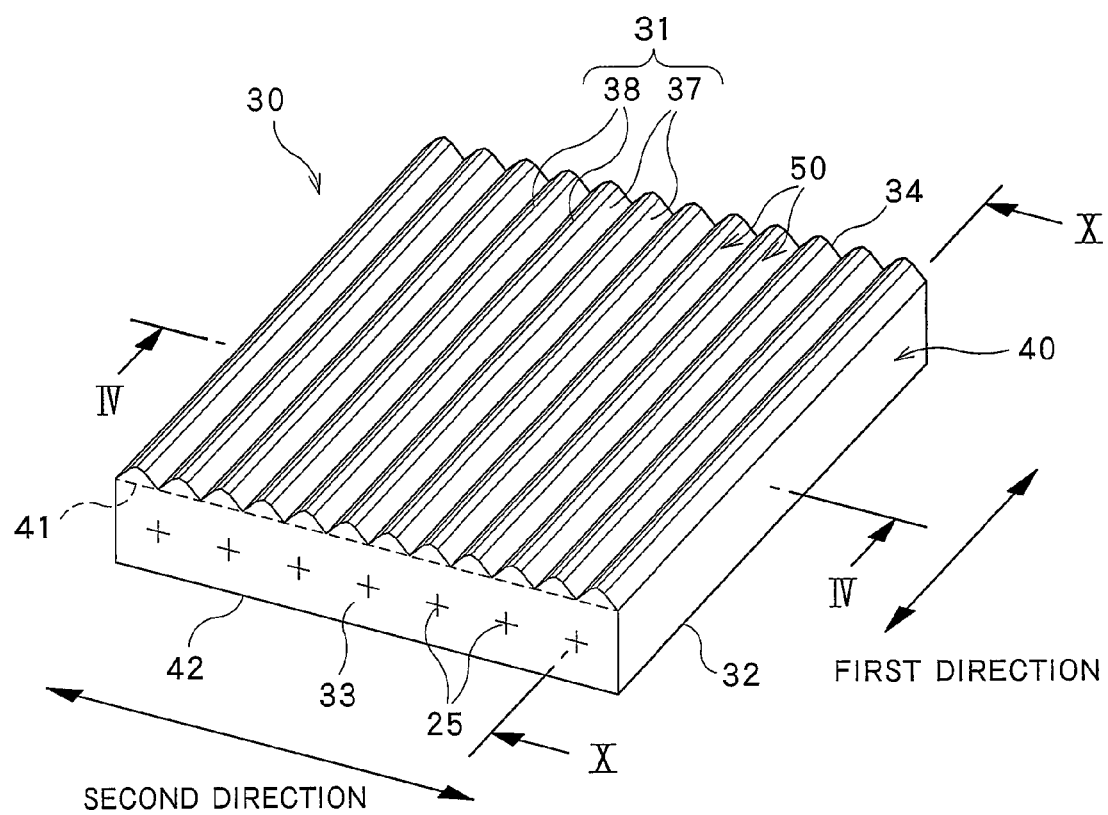
FIG. 3 is a perspective view of a light guide plate incorporated into the surface light source device of FIG. 1.
Figure 4:
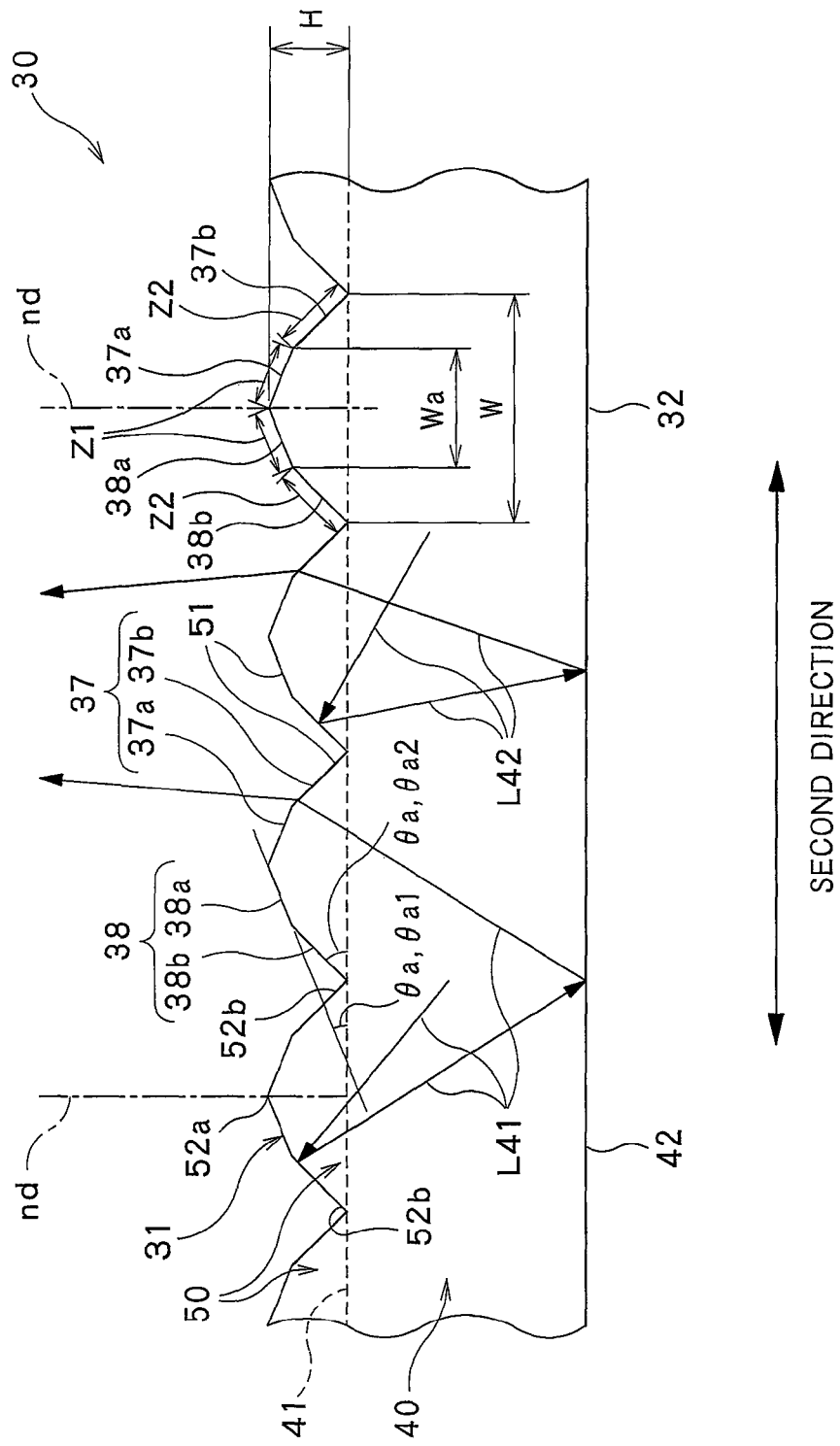
FIG. 4 is a diagram illustrating the action of the light guide plate, showing the light guide plate in the cross-section along the line IV-IV of FIG. 3.
Figure 5:
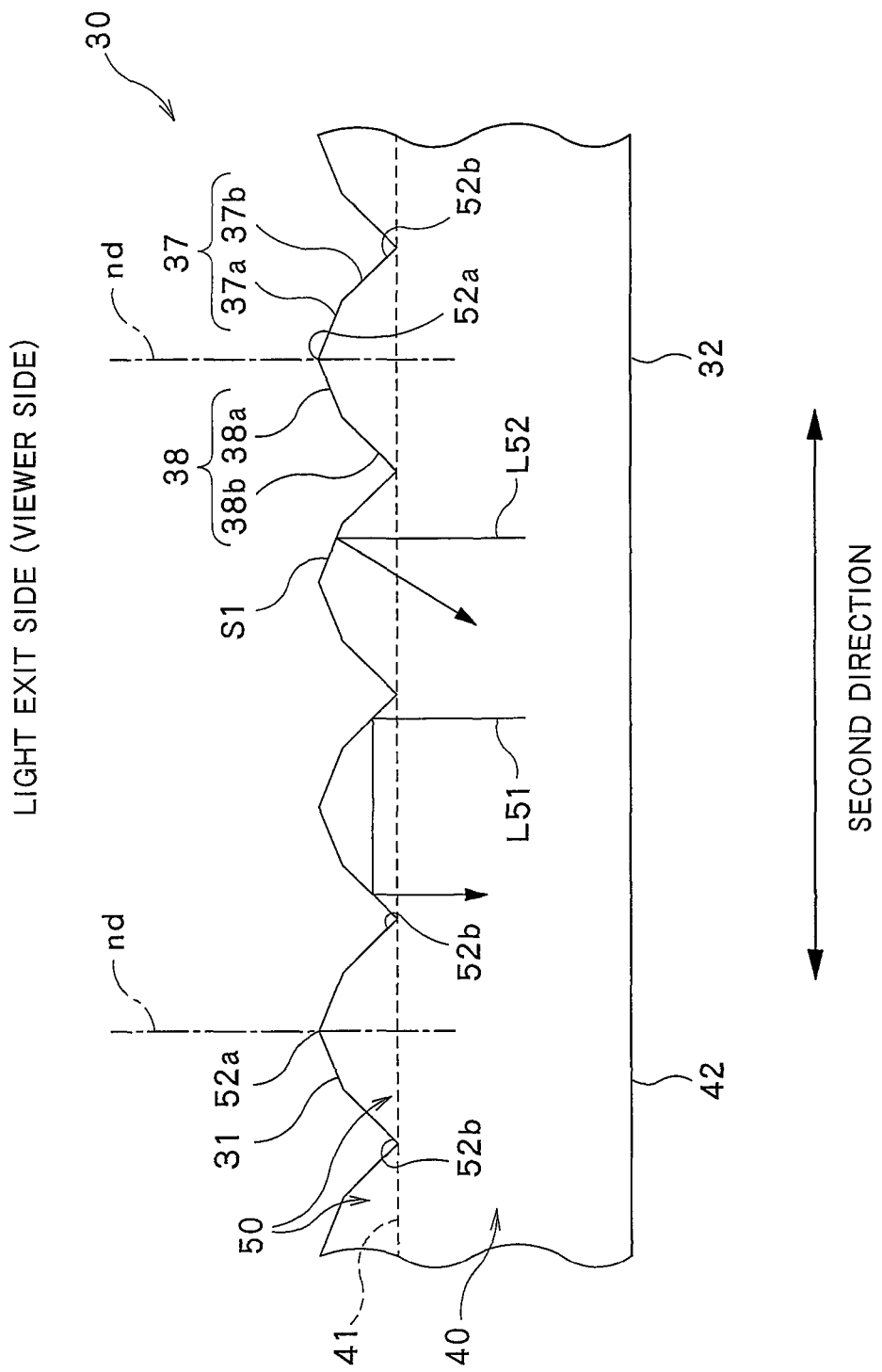
FIG. 5 is a cross-sectional diagram corresponding to FIG. 4, illustrating the action of the light guide plate mainly in the vicinity of its light entrance surface.
Figure 6:
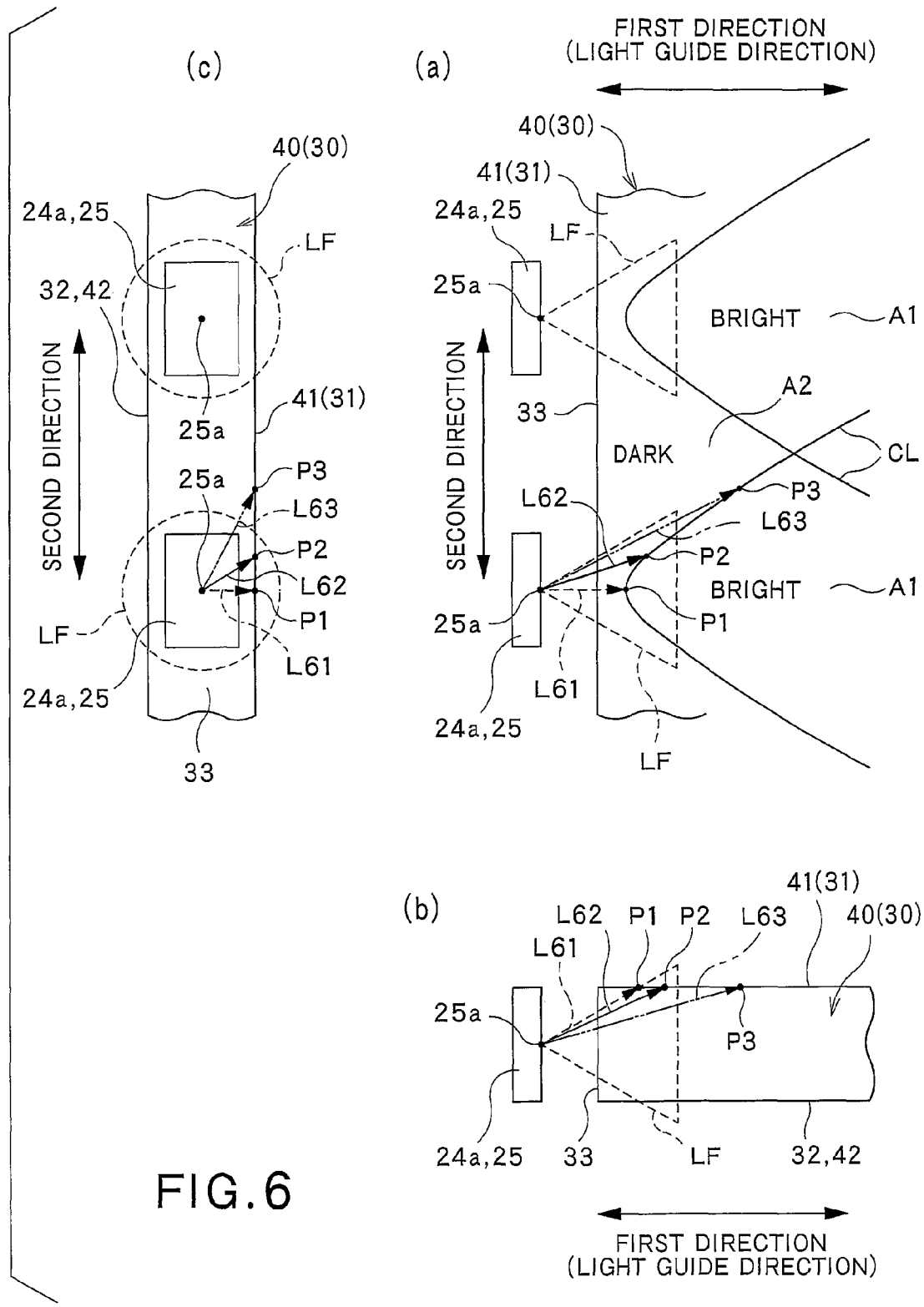
FIGS. 6(a) through 6(c) are diagrams illustrating the action of the light guide plate in the vicinity of its light entrance surface, and showing the path of source light that enters the body portion of the light guide plate, FIG. 6(a) being a plan view showing the light guide plate, from which its unit shaped elements are omitted, as viewed from the side of the light exit surface, FIG. 6(b) being a diagram showing the light guide plate, from which its unit shaped elements are omitted, as viewed in a direction (second direction) parallel to both the light exit surface and the light entrance surface (i.e. as viewed in lateral direction), and FIG. 6(c) being a diagram showing the light guide plate, from which its unit shaped elements are omitted, as viewed from the side of the light entrance surface.

FIGS. 1 through 6(c) are diagrams illustrating an embodiment of the present invention. Of these, FIG. 1 is a cross-sectional view showing the schematic construction of a display device and a surface light source device, and FIG. 2 is a cross-sectional view illustrating the action of the surface light source device. FIG. 3 is a perspective view showing a light guide plate incorporated into the surface light source device, and FIGS. 4 and 5 are cross-sectional views each showing the light guide plate in the main cross-section. FIGS. 6(a) through 6(c) are diagrams illustrating the path of light from a light source in the vicinity of the light entrance surface of the light guide plate. The light guide plate of FIGS. 1 and 2 is shown in the cross-section taken along the line X-X of FIG. 3.

As shown in FIG. 1, the display device 10 includes a liquid crystal display panel 15, a surface light source device 20, disposed at the rear of the liquid crystal display panel 15, for illuminating the liquid crystal display panel 15 from the back, and a controller 18 for controlling the liquid crystal display panel 15 and the surface light source device 20. The display device 10 has a display surface 11.

The illustrated liquid crystal display panel 15 includes an upper polarizing plate 13 disposed on the light exit side, a lower polarizing plate 14 disposed on the light entrance side, and a liquid crystal cell 12 disposed between the upper polarizing plate 13 and the lower polarizing plate 14. The liquid crystal cell 12 is a member including a pair of support plates, e.g. made of glass, a liquid crystal disposed between the support plates, and an electrode for controlling the orientation of liquid crystal molecules by an electric field for each pixel region. The controller 18 is configured to control the orientation of liquid crystal molecules for each pixel. The liquid crystal display panel 15 thus functions as a shutter which controls transmission and blocking of light from the surface light source device 20 for each pixel, and can form an image through selective transmission of planar light from the surface light source device 20. The details of the liquid crystal display panel 15 are known from various documents (see e.g. "Dictionary of Flat Panel Display", edited by T. Uchida and H. Uchiike, 2001, Kogyo Chosakai Publishing Co., Ltd.), and hence a further detailed description thereof will be omitted.

The surface light source device 20 will now be described. The surface light source device 20 has a light emitting surface 21 which emits light over the area, and illuminates the liquid crystal display panel 15 from the back. As shown in FIG. 1, the surface light source device 20 is configured as an edge-light type surface light source device, and includes a light guide plate 30 and light sources 24a, 24b disposed lateral to the light guide plate 30. The light guide plate 30 has a light exit surface 31 which is the main surface on the side of the liquid crystal display panel 15, a back surface 32 which is the other main surface opposed to the light exit surface 31, and side surfaces as a side surface extending between the light exit surface 31 and the back surface 32. Part of the side surfaces of the light guide plate 30 constitutes at least one light entrance surface and, in this embodiment, the light sources 24a, 24b are disposed so as to face two light entrance surfaces. In particular, the side surfaces include one light entrance surface 33 and a counter surface 34 that opposes the one light entrance surface 34. Light that has entered the light guide plate 30 from the one light entrance surface 33 is guided in the light guide plate 30 generally along a first direction (light guide direction) connecting the one light entrance surface 33 and the counter surface 34 that opposes the one light guide surface 33. The surface light source device 20 further includes a reflective sheet 22 disposed so as to face the back surface 32 of the light guide plate 30, and an optical sheet 26 disposed so as to face the light exit surface 31 of the light guide plate 30.

In the illustrated embodiment, as with the display surface 11 of the liquid crystal display device 10 and the light emitting surface 21 of the surface light source device 20, the light exit surface 31 of the light guide plate 30 is formed in a square shape. Thus, the light guide plate 30 is a square plate-like member having a pair of the main surfaces (the light exit surface 31 and the back surface 32) and four side surfaces as a side surface defined between the pair of the main surfaces. Of the side surfaces, the two side surfaces that oppose each other in the first direction are the light entrance surfaces 33, 34, as shown in FIG. 1. The one light entrance surface 33 serves as a first light entrance surface and the counter surface 34, opposing the first light entrance surface 33 in the first direction, serves as a second light entrance surface. As shown in FIG. 1, a first light source 24a is disposed so as to face the first light entrance surface 33, and a second light source 24b is disposed so as to face the second light entrance surface 34. The light guide plate 30 of this embodiment has a constant cross-sectional shape at varying positions along the first direction.

Various types of light emitters, including a fluorescent light such as a linear cold-cathode fluorescent lamp, point-like LEDs (light emitting diodes), an incandescent bulb, etc., can be used as the first light source 24a and the second light source 24b. In this embodiment the first light source 24a and the second light source 24b are each comprised of a large number of point-like light emitters 25, in particular light emitting diodes (LEDs), arranged side by side along the longitudinal direction of the corresponding light entrance surface 33 or 34. FIG. 3 shows the arrangement positions of the point-like light emitters 25 constituting the first light source 24a. The controller 18 can control the output of an individual point-like light emitter 25, i.e. turn-on and turn-off of an individual point-like light emitter 25 and/or the luminance of the light emitter 25, independent of the other point-like light emitters.

The reflective sheet 22 is a member which reflects light that has exited the back surface 32 of the light guide plate 30 so that the light will re-enter the light guide plate 30. The reflective sheet 22 may be comprised of a white scattering reflection sheet, a sheet composed of a material having high reflectance, such as a metal, a sheet having a surface film layer of a high-reflectance material (e.g. a metal film), or the like.

The optical sheet 26 is a sheet-like member for changing the travel direction of light that has entered the light entrance side of the optical sheet 26 and causing the light to exit the light exit side, thereby intensively increasing the front-direction luminance. In the embodiment illustrated in FIGS. 1 and 2, the optical sheet 26 has a plurality of unit prisms 27 arranged side by side on the sheet plane in one direction (arrangement direction) on the sheet plane, in particular in the first direction connecting the light entrance surface 33 (34) of the light guide plate 30 and the counter surface 34 (33) that opposes the light guide surface 33 (34). The unit prisms 27 each extend in a straight line in a direction perpendicular to the arrangement direction and parallel to the sheet plane of the optical sheet 30. Each unit prism 27 has a triangular cross-sectional shape in a cross-section perpendicular to the longitudinal direction thereof. The top (apex) 28 of the triangular cross-section of each unit prism 27 projects toward the light guide plate 30.

The terms "sheet", "film" and "plate" are not used herein to strictly distinguish them from one another. Thus, the term "sheet" includes a member which can also be called a film or plate.

The term "sheet plane (plate plane, film plane)" herein refers to a plane which coincides with the planar direction of an objective sheet-like member when taking a perspective and overall view of the sheet-like member. In this embodiment the plate plane of the light guide plate 30, the sheet plane of the optical sheet 26, the sheet plane of the reflective sheet 22, the panel plane of the liquid crystal display panel, the display surface 11 of the display device 10 and the light emitting surface 21 of the surface light source device 20 are parallel to each other. The term "front direction" herein refers to the normal direction nd (see e.g. FIGS. 2 and 4) of the light emitting surface 21 of the surface light source device 20, and in this embodiment coincides with the normal direction of the display surface 11 of the display device 10 and the normal direction of the plate plane of the light guide plate 30 and, when taking a perspective and overall view, also coincides with the normal direction of the light exit surface 31 of the light guide plate 30.

The terms "unit shaped element", "prism" and "lens" herein refer to an element (optical element) which has a shape capable of exerting an optical action, such as refraction or reflection, on incident light, and are not used herein to strictly distinguish them from one another.

The light guide plate 30 will now be described in greater detail mainly with reference to FIGS. 2 through 4. As well shown in FIGS. 2 and 3, the light guide plate 30 comprises a plate-like body portion 40 and unit shaped elements (unit optical elements, unit prisms) 50 formed on the one-side surface (light exit-side surface) 41 of the body portion 40. The body portion 40 is a flat plate-like member having a pair of the parallel main surfaces. The other-side surface 42 of the body portion 40, which faces the reflective sheet 22, is the back surface 32 of the light guide plate 30.

As shown in FIG. 2, the body portion 40 comprises a resin matrix 44 and a diffusing component 45 dispersed in the matrix 44. The diffusing component 45 herein refers to a component which can exert an optical action, such as refraction or reflection, on light traveling in the body portion 40 to change the travel direction of the light. Such a light diffusing effect (light scattering effect) of the light diffusing component 45 can be produced by using, as the light diffusing component 45, a material having a different refractive index from that of the matrix 44, or a material which can exert a reflective effect on light. The diffusing component 45 having a different refractive index from that of the matrix 44 may be exemplified by a metal compound or a porous material having pores, or air bubbles. In Figures other than FIG. 2, depiction of the diffusing component 45 is omitted.

The unit shaped elements 50 provided on the one-side surface 41 of the body portion 40 will now be described. As well shown in FIG. 3, the unit shaped elements 50 are arranged side by side on the one-side surface 41 of the body portion 40 in the arrangement direction intersecting the first direction and parallel to the one-side surface 41 of the body portion 40. Each unit shaped element 50 extends linearly on the one-side surface 41 of the body portion 40 in a direction intersecting the arrangement direction.

Particularly in this embodiment, the unit shaped elements 50 are arranged on the one-side surface 41 of the body portion 40 side by side with no space therebetween in a second direction (arrangement direction) perpendicular to the first direction. Thus, the light exit surface 31 of the light guide plate 30 is constituted by the light exit-side surface 51 of the unit shaped elements 50. Each unit shaped element 50 extends in a straight line along the first direction perpendicular to the second direction. Each unit shaped element 50 has a columnar shape, and has the same cross-sectional shape along the longitudinal direction. Further, in this embodiment all the unit shaped elements 50 have the same construction.

In the cross-section shown in FIGS. 4 and 5, i.e. the cross-section parallel to both the arrangement direction (second direction) of the unit shaped elements 50 and the normal direction nd of the one-side surface 41 of the body portion 40 (plate plane of the light guide plate 30) (hereinafter also referred to simply as "main cross-section"), each unit shaped element 50 has the following cross-sectional shape. In this embodiment, the contour (light exit-side surface) 51 of the unit shaped element 50 in the main cross-section includes a zone (first zone) Z1 where a light exit surface angle θa, which is the angle of the contour 51 with respect to the one-side surface 41 of the body portion 40, is more than 10° and not more than 30°. The width of the first zone Z1 along the arrangement direction of the unit shaped elements 50 (i.e. the second direction) accounts for not less than 35% and not more than 70% of the full width W of the unit shaped element 50.

Thus, the first zone Z1 having a light exit surface angle θa of more than 10° and not more than 30°, when projected in the front direction nd, accounts for not less than 35% and not more than 70% of the full width W of the unit shaped element 50. In the embodiment illustrated in FIG. 4, the width Wa of the first zone Z1 along the arrangement direction of the unit shaped elements 50 is not less than 35% and not more than 70% of the full width W of the unit shaped element 50. When the light exit surface 31 of the light guide plate 30 is viewed in the front direction nd, the area in which the light exit surface angle θa of the unit shaped element 50 is more than 10° and not more than 30° accounts for not less than 35% and not more than 70% of the entire area of the light exit-side surface (contour) 51 of the unit shaped element 50. As described in detail later and as demonstrated by the experimental results in the below-described Examples, the provision of the first zone Z1, having a light exit surface angle θa of more than 10° and not more than 30°, in the light exit-side surface 51 of each unit shaped element 50 can prevent variation of brightness from being produced in those areas of the display surface 11 or the light emitting surface 21 which lie in the vicinity of the light entrance surfaces 33, 34 that face the light sources 24a, 24b, respectively.

As described above, the light exit surface angle θa refers to the angle of the light exit-side surface (contour) 51 of each unit shaped element 50 with respect to the one-side surface 41 of the body portion 40 in the main cross-section of the light guide plate 30. When the contour (light exit-side surface) 51 of each unit shaped element 50 in the main cross-section has the shape of a polygonal line as in the embodiment illustrate in FIG. 4, the light exit surface angle θa refers to the angle formed between a straight line segment of the polygonal line and the one-side surface 41 of the body portion 40 (more precisely the smaller one (minor angle) of the two angles formed). On the other hand, the contour (light exit-side surface) 51 of each unit shaped element 50 in the main cross-section may have the shape of a curved line as in the below-described variations (see FIGS. 7 and 8). In such a case, the light exit surface angle θa refers to the angle formed between a tangent TL to the curved contour 51 of a unit shaped element 50 and the one-side surface 41 of the body portion 40 (more precisely the smaller one (minor angle) of the two angles formed).

In this embodiment, the contour (light exit-side surface) 51 of the unit shaped element 50 in the main cross-section also includes a zone (second zone) Z2 where the light exit surface angle θa is more than 30° and not more than 60°. The width of the second zone Z2 along the arrangement direction of the unit shaped elements 50 (i.e. the second direction) accounts for not less than 30% and not more than 65% of the full width W of the unit shaped element 50. Thus, the second zone Z2 having a light exit surface angle θa of more than 30° and not more than 60°, when projected in the front direction nd, accounts for not less than 30% and not more than 65% of the full width W of the unit shaped element 50. When the light exit surface 31 of the light guide plate 30 is viewed in the front direction nd, the area in which the light exit surface angle θa of the unit shaped element 50 is more than 30° and not more than 60° accounts for not less than 30% and not more than 65% of the entire area of the light exit-side surface (contour) 51 of the unit shaped element 50. As described in detail later and as demonstrated by the experimental results in the below-described Examples, the provision of the second zone Z2, having a light exit surface angle θa of more than 30° and not more than 60°, in the light exit-side surface 51 of each unit shaped element 50 enables the light guide plate 30 to exert an excellent light condensing effect on a light component along the arrangement direction of the unit shaped elements 50 (the second direction).

In this embodiment, the light exit surface angle θa is more than 10° and not more than 60° in the entire contour (light exit-side surface) 51 of the unit shaped element 50 in the main cross-section. The light guide plate 30 having such unit shaped elements 50 can prevent variation of brightness from being produced in those areas of the display surface 11 or the light emitting surface 21 which lie in the vicinity of the light entrance surfaces 33, 34 and, in addition, can exert an excellent light condensing effect on a light component along the arrangement direction of the unit shaped elements 50 (the second direction).

Further, in this embodiment, the light exit surface angle θa of the unit shaped element 50 increases with distance from the top 52a of the contour 51 of the unit shaped element 50, i.e. the farthest point from the body portion 40 toward the end 52b of the contour 51 of the unit shaped element 50, i.e. the point nearest to the body portion 40. The light guide plate 30 having such unit shaped elements 50 can more effectively exert the effect of preventing variation of brightness from being produced in those areas of the display surface 11 or the light emitting surface 21 which lie in the vicinity of the light entrance surfaces 33, 34, and the effect of condensing a light component along the arrangement direction of the unit shaped elements 50 (the second direction).

The expression "the light exit surface angle θa of the unit shaped element 50 increases with distance from the top 52a toward the end 52b of the contour 51 of the unit shaped element 50" does not necessarily mean constant increase (continuous increase) in the light exit surface angle with distance from the top 52a toward the end 52b. There may be a zone(s) in the contour 51 where the light exit surface angle θa does not change (increase) as in the embodiment illustrated in FIG. 4, in which the contour 51 of the unit shaped element 50 in the main cross-section has the shape of a polygonal line or a polygonal line-like shape having chamfered corners. Thus, the expression "the light exit surface angle θa of the unit shaped element 50 increases with distance from the top 52a toward the end 52b of the contour 51 of the unit shaped element 50" herein encompasses such a cross-sectional shape (contour 51) of a unit shaped element 50 that the light exit surface angle θa is larger at either end 52b of the contour 51 than at the top 52a, and that the contour 51 does not include a region where the light exit surface angle θa decreases with distance from the top 52a toward the end 52b.

The exemplary unit shaped elements 50 shown in FIGS. 4 and 5 each have, in the main cross-section of the light guide plate 30, a pentagonal shape whose one side lies on the one-side surface 41 of the body portion 40 and whose two sides lie between the top 52a and each end 52b of the contour 51, or a shape in which one or more of the corners of said polygonal shape are chamfered. In the illustrated embodiment, in order to effectively increase the front-direction luminance and to impart symmetry to the angular distribution of luminance in a plane along the second direction, the cross-sectional shape of each unit shaped element 50 in the main cross-section is made symmetrical with respect to the front direction nd. In particular, as well shown in FIGS. 4 and 5, the light exit-side surface 51 of each unit shaped element 50 is composed of a pair of bent surfaces 37, 38 which are symmetrical with respect to the front direction nd. The bent surfaces 37, 38 are connected to each other, and the connection defines the top 52a. The pair of bent surfaces 37, 38 consist of a pair of first inclined surfaces 37a, 38a that define the top 52a, and a pair of second inclined surfaces 37b, 38b extending from the body portion 40 and connecting to the first inclined surfaces 37a, 38a, respectively. The pair of first inclined surfaces 37a, 38a are symmetrical with respect to the front direction nd, and the pair of second inclined surfaces 37b, 38b are also symmetrical with respect to the front direction nd.

Of the four sides of the contour 51 of each unit shaped element 50 in the main cross-section, the top 52a-side sides, corresponding to the first inclined surfaces 37a, 38a, have a light exit surface angle θa1 of more than 10° and not more than 30°, and the end 52b-side sides, corresponding to the second inclined surfaces 37b, 38b, have a light exit surface angle θa2 of more than 30° and not more than 60°. Thus, the above-described first zone Z1 in the contour 51 of the unit shaped element 50 corresponds to the pair of first inclined surfaces 37a, 38a which are symmetrical with respect to the front direction nd, and the above-described second zone Z2 in the contour 51 of the unit shaped element 50 corresponds to the pair of second inclined surfaces 37b, 38b which are symmetrical with respect to the front direction nd.

In the main cross-section of the light guide plate 30, the ratio (H/W) of the height H of each unit shaped element 50 from the body portion 40 in the front direction relative to the width W of the unit shaped element 50 in the arrangement direction is preferably not less than 0.2 and not more than 0.4. Such unit shaped elements 50, through refraction of light at the light exit-side surface 51, can exert an excellent light condensing effect on a light component along the arrangement direction of the unit shaped elements 50 (the second direction).

The term "pentagonal shape" herein includes not only a pentagonal shape in the strict sense but also a generally pentagonal shape that may reflect limitations in production technique, a molding error, etc. Similarly, the terms used herein to specify shapes or geometric conditions, such as "parallel", "perpendicular", "symmetrical", etc., should not be bound to their strict sense, and should be construed to include equivalents or resemblances from which the same optical function or effect can be expected.

The light guide plate 30 may have the following dimensions: The width W (see FIG. 4) of each unit shaped 50 may be not less than 0.05 mm and not more than 0.5 mm. When the contour 51 of each unit shaped element 50 in the main cross-section has a generally pentagonal shape in which the corners are chamfered, the chamfered corners preferably have a radius of curvature not more than the width W of the unit shaped element 50. If the radius of curvature is more than the width W of the unit shaped element 50, the unit shaped elements 50 cannot perform the expected function. The thickness of the body portion 40 may be in the range of 0.5 mm to 6 mm.

The thus-constructed light guide plate 30 can be produced e.g. by forming the unit shaped elements 50 on a substrate or by extrusion. While a variety of materials can be used for the matrix 44 of the body portion 40 of the light guide plate 30 and for the unit shaped elements 50, it is preferred to use those materials which are widely used for optical sheets to be incorporated into display devices, have excellent mechanical properties, optical properties, stability and processability, and are commercially available at low prices. Examples of such materials include a transparent resin mainly comprising at least one of acrylate, styrene, polycarbonate, polyethylene terephthalate, acrylonitrile, etc., and a reactive resin (e.g. ionizing radiation curable resin) such as an epoxy acrylate resin or a urethane acrylate resin. Particles of a transparent material such as silica (silicon dioxide), alumina (aluminum oxide), an acrylic resin, a polycarbonate resin or a silicone resin, having an average particle size of about 0.5 to 100 μm, may be used as the diffusing component 45.

When the light guide plate 30 is produced by curing an ionizing radiation curable resin on a substrate, it is possible to form, together with the unit shaped elements 50, a sheet-like land portion between the substrate and the unit shaped elements 50. In this case, the body portion 40 consists of the substrate and the land portion formed from the ionizing radiation curable resin. A plate-like resin extrudate containing a diffusing component can be used as the substrate.

When extrusion is employed to produce the light guide plate 30, the body portion 40 and the unit shaped elements 50 on the one-side surface 41 of the body portion 40 can be formed integrally. When the light guide plate 30 is produced by extrusion, the unit shaped elements 50 may be composed of the same resin material as the material of the matrix 44 of the body portion 40, and the same particles as the diffusing component 45 of the body portion 40. The light guide plate 30 may be produced by co-extrusion. In that case, the body portion 40 may be composed of the matrix 44 of a resin material and the diffusing component 45 dispersed in the matrix 44, while the unit shaped elements 50 may be composed of the same resin material as the material of the matrix 44 of the body portion 40, and particles having a different function from the diffusing component 45 of the body portion 40, or may be composed solely of the same resin material as the material of the matrix 44 of the body portion 40.

The operation of the thus-constructed display device 10 will now be described.

As shown in FIG. 2, light emitted by the light emitters 25 of the light sources 24a, 24b passes through the light entrance surfaces 33, 34 and enters the light guide plate 30. FIG. 2 illustrates, by way of example, light which comes from the first light source 24a and enters the light guide plate 30 through the first light entrance surface 33. The following description illustrates the operations of the surface light source device 20 and the display device 10 with reference to the exemplary light shown in FIG. 2. The light guide plate 30 is constructed symmetrically with respect to a center position Pc in the first direction. The first light source 24a and the second light source 24b are constructed symmetrically on opposite sides of the light guide plate 30 in the first direction. Likewise, the other components of the surface light source device 20, such as the optical sheet 26, and the liquid crystal display panel 15 are symmetrically constructed. Because of the constructional symmetry, the following description holds true for light which comes from the second light source 24b and enters the light guide plate 30 through the second light entrance surface 34.

As shown in FIG. 2, lights L21, L22 that have entered the light guide plate 30 repeat reflection, in particular total reflection at the light exit surface 31 and the back surface 32 due to the difference in refractive index between air and the material of the light guide plate 30, and travels in the first direction (light guide direction) connecting the light entrance surface 33 and the counter surface (the other light entrance surface) 34 of the light guide plate 30.

The body portion 40 of the light guide plate 30 contains the diffusing component 45 dispersed in the matrix. Therefore, as shown in FIG. 2, the travel directions of the lights L21, L22 traveling in the light guide plate 30 are irregularly changed by the diffusing component 45, and the lights sometimes enter the light exit surface 31 or the back surface 32 at an incident angle which is less than the critical angle for total reflection. Thus, the lights L21, L22 can exit the light exit surface 31 or the back surface 32 of the light guide plate 30. The lights L21, L22 that have exited the light exit surface 31 travel toward the optical sheet 26 disposed on the light exit side of the light guide plate 30. On the other hand, light that has exited the back surface 32 is reflected by the reflective sheet 22 disposed behind the light guide plate 30, and re-enters the light guide plate 30 and travels in the light guide plate 30.

Light traveling in the light guide plate 30 can collide with the diffusing component 45, dispersed in the light guide plate 30, at various places in the light guide plate 30 along the light guide direction. Accordingly, light traveling in the light guide plate 30 exits the light exit surface 31 little by little. Thus, the distribution of the amount of light, exiting the light exit surface 31 of the light guide plate 30, along the light guide direction (the first direction) can be made uniform.

As shown in FIG. 4, the cross-sectional shape of each unit shaped element 50 in the main cross-section is a pentagonal shape which is symmetrical with respect to the front direction, or a generally pentagonal shape in which one or more corners of the pentagonal shape are chamfered. In particular, as described above, the light exit surface 31 of the light guide plate 30 is constructed as the bent surfaces 37, 38 which are inclined with respect to the back surface 32 of the light guide plate 30. Light which totally reflects at the bent surfaces 37, 38 and travels in the light guide plate 30 and light which passes through the bent surfaces 37, 38 and exits the light guide plate 30 are subject to the following actions of the light exit surface 31 composed of the bent surfaces 37, 38. The actions exerted on light which totally reflects at the light exit surface 31 composed of the bent surfaces 37, 38 and travels in the light guide plate 30 will be described first.

FIG. 4 shows, in the main cross-section of the light guide plate 30, the paths of lights L41, L42 which travel in the light guide plate 30 in the light guide direction (the first direction) while repeating total reflection at the light exit surface 31 and the back surface 32. As described above, the light exit surface 31 of the light guide plate 30 is the light exit-side surface 51 of the unit shaped elements 50 each having a pentagonal cross-sectional shape which is symmetrical with respect to the front direction, or a generally pentagonal cross-sectional shape in which one or more of the corners of said polygonal shape are chamfered. In particular, the light exit surface 31 of the light guide plate 30 is composed of the two types of bent surfaces 37, 38 which are oppositely inclined with respect to the normal direction nd of the one-side surface 41 of the body portion 40. The two types of oppositely (reversely) inclined surfaces 37, 38 are arranged alternately along the second direction. As shown in FIG. 4, the lights L41, 42, traveling in the light guide plate 30 toward the light exit surface 31 and entering the light exit surface 31, in most cases enters an inclined surface which is inclined toward the opposite direction (reverse direction) to the travel directions of the lights from the normal direction nd of the one-side surface 41 of the body portion 40 in the main cross-section of the light guide plate 30.

Consequently, as shown in FIG. 4, the lights L41, 42 traveling in the light guide plate 30, in most cases when they totally reflect at the bent surfaces 37, 38 of the light exit surface 31, come to turn toward the opposite side (reverse side) of the front direction nd in the main cross-section. Thus, a light component along the second direction is likely to be directed toward the opposite side (reverse side) by its total reflection at the light exit surface 31. In this manner, with reference to light which is being guided in the light guide plate in the first direction (light guide direction), the travel direction of the light in the second direction is likely to be reversed upon its total reflection at the light exit surface 31. Accordingly, even light which has been emitted by the light emitters 25 of the light source 24a or 24b in a direction highly inclined with respect to the first direction and which has entered the light guide plate 30, comes to travel mainly in the first direction while the movement in the second direction is restricted. This makes it possible to adjust the distribution of the amount of light, exiting the light exit surface 31 of the light guide plate 30, along the second direction by the construction of the light sources 24a, 24b (e.g. the arrangement of the light emitters 25) or by the outputs of the light emitters 25a.

The optical action of the bent surfaces 37, 38 on light which passes though the bent surfaces 37, 38 and exits the light guide plate 30 will now be described. As shown in FIG. 4, the lights L41, L42, exiting the light guide plate 30 through the unit shaped elements 50, are refracted at the bent surfaces 37, 38 constituting the light exit-side surface 51 of the unit prisms 50, i.e. the light exit surface 31 of the light guide plate 30. Due to the refraction, the lights L41, L42, each traveling in a direction inclined from the front direction nd in the main cross-section, are bent such that the angle of the travel direction (exit direction) of each light with respect to the front direction nd becomes smaller. Thus, with reference to a light component along the second direction perpendicular to the light guide direction, the unit shaped elements 50 can change the travel direction of the transmitted light toward the front direction nd. The unit shaped prisms 50 thus exert a light condensing effect on a light component along the second direction perpendicular to the light guide direction. In this manner, the exit angle of light exiting the light guide plate 30 is narrowed down into a narrow angular range around the front direction in a plane parallel to the arrangement direction of the unit shaped elements 50 of the light guide plate 30.

As shown in FIG. 2, the lights L21, L22 that have exited the light exit surface 31 of the light guide plate 30 enter the optical sheet 26. As described above, the optical sheet 26 has the unit prisms 27 each having a triangular cross-sectional shape and projecting toward the light guide plate 30. As well shown in FIG. 2, the longitudinal direction of the unit prisms 27 is parallel to a direction intersecting the light guide direction (the first direction) in the light guide plate 30, and in this embodiment is parallel to the second direction perpendicular to the light guide direction. Due to the difference in refractive index between air and the material of the light guide plate 30, the exit angle of the first-direction component of light exiting the light exit surface 31 of the light guide plate 30 (angle θc formed between the first-direction component of exiting light and the normal direction nd of the plate plane of the light guide plate 30) tends to fall within a particular angular range (e.g. 65°-85°).

It is therefore possible to design the optical sheet 26 so that light that has exited the light exit surface 31 of the light guide plate 30 mostly passes through one prism surface 27a of a unit prism 27 of the optical sheet 26 and enters the unit prism 27, and thereafter totally reflects at the other prism surface 27b of the unit prism 27, as shown in FIG. 2. Due to the total reflection at the prism surfaces 27b of unit prisms 27, the lights L21, L22, each traveling in a direction inclined from the front direction nd in the cross-section of FIG. 2 (cross-section parallel to both the first direction and the front direction nd), are bent such that the angle of the travel direction of each light with respect to the front direction nd becomes smaller. Thus, with reference to a light component along the first direction (light guide direction), the unit prisms 27 can change the travel direction of the transmitted light toward the front direction nd. The optical sheet 26 thus exerts a light condensing effect on a light component along the first direction.

Light whose travel direction is significantly changed by the unit prisms 27 of the optical sheet 26 is mainly a light component traveling in the first direction, i.e. the arrangement direction of the unit prisms 27, and thus differs from the light component traveling in the second direction which is condensed by the light exit-side surface 51 of the unit optical elements 50 of the light guide plate 30. Accordingly, the front-direction luminance, which has been increased by the unit shaped elements 50 of the light guide plate 30, is not impaired but can be further increased by the optical action at the unit prisms 27 of the optical sheet 26.

As described hereinabove, the surface light source device 20 equalizes the distribution of the amount of exiting light along the first direction (light guide direction), increases the front-direction luminance and emits light from the entire light emitting surface 21. Light that has exited the surface light source device 20 enters the liquid crystal display panel 15. The liquid crystal display panel 15 allows light from the surface light source device 20 to pass therethrough selectively for each pixel, so that a viewer can view an image on the liquid crystal display device 10.

As described above, light that has entered the light guide plate 30 comes to travel in the first direction while the movement in the second direction is restricted by the bent surfaces 37, 38 constituting the light exit-side surface 51 of the unit shaped elements 50. Thus, light emitted by each of the large number of light emitters 25 of the light sources 24a, 24b exits the light exit surface 31 of the light guide plate 30 mainly from a certain area which lies in a certain range in the second direction and extends in the first direction. Therefore, the controller 18 may adjust the output of each light emitter 25 according to an image to be displayed on the display surface 11 of the display device 10.

For example, when no image is to be displayed, in other words, a black is to be displayed in a particular area of the display surface 11 of the display device 10, it is possible to turn off a point-like light emitter 25 which supplies light to that area of the light exit surface 31 of the light guide plate 30 which corresponds to the particular area of the display surface 10. This can solve the conventional problem of poor contrast due to incomplete blocking by the display panel 15 of illuminating light from the surface light source device 20. Further, this can reduce the amount of power, and thus is preferred also from the viewpoint of energy saving.

In addition to the case of displaying a black, it is possible to adjust the output of each point-like light emitter 25 according to an image to be displayed on the display surface 11, thereby adjusting brightness in various areas of a displayed image without solely relying on the display panel 15. This also can enhance the contrast in a displayed image and achieve energy saving.

With environmental concerns growing these days, light emitting diodes are attracting attention for use as light emitters in a light source. Light emitting diodes are far superior in energy efficiency to cold-cathode fluorescent lamps which have been commonly used as light emitters for light sources. However, it has been found by the present inventors that when a linear array of point-like light emitters, such as light emitting diodes, is used as a light source, in place of the conventional light source comprised of a cold-cathode fluorescent lamp, in a surface light source device in a display device, variation of brightness, i.e. in-plane variation of luminance, is produced in an area of the light exit surface of a light guide plate, the area lying in the vicinity of the light entrance surface of the light guide plate, or in that area of the light emitting surface of the surface light source device or the display surface of the display device which corresponds to the area of the light exit surface of the light guide plate.

The inventors' researches have revealed that when a linear array of point-like light emitters, such as light emitting diodes, is used as a light source, variation of brightness, in particular a pattern of alternating bright and dark portions, is formed at the same pitch as the arrangement pitch of the point-like light emitters along the arrangement direction (the second direction) of the point-like light emitters in an area of the light exit surface of a light guide plate, lying in the vicinity of the light source-facing light entrance surface of the light guide plate.

Nowadays, a light guide plate is becoming widely used which has prisms extending linearly along the light guide direction (the first direction) and arranged in a direction (the second direction) perpendicular to the light guide direction. The linear prisms define the light exit surface of the light guide plate, and exert a light condensing effect on light exiting the light guide plate. In particular, the linear prisms have prism surfaces (inclined surfaces) inclined at about 45° with respect to the front direction. Due to refraction at a prism surface, transmitted light is deflected such that the angle of the travel direction with respect to the front direction becomes smaller. On the other hand, light which cannot be deflected into a narrow angular range around the front direction is turned back toward the back surface by reflection, especially total reflection, of the light at a prism surface.

It has been found by the present inventors that when such unit prisms, having a light condensing function, are provided in a light guide plate, variation of brightness along the second direction in an area of the light exit surface of the light guide plate, lying in the vicinity of the light entrance surface of the light guide plate, becomes more marked, and, in more detail, such a variation of brightness along the second direction is produced in a wider area of the light exit surface.

On the other hand, it has turned out that the above-described embodiment of the present invention can effectively prevent the occurrence of the brightness (luminance) variation problem. While the reason for the occurrence of the problematic phenomenon is not fully clear, the following may be considered as a possible reason. A description will also be given of a possible reason why the above-described embodiment of the present invention can obscure the in-plane variation of luminance. The present invention, however, is not bound by the below-described theory.

As shown in FIGS. 6(a) through 6(c), the point-like light emitters 25 (e.g. light emitting diodes) of the light sources 24a, 24b, disposed so as to face the light entrance surfaces 33, 34 of the light guide plate 30, each emit light radially. FIGS. 6(a) through 6(c) illustrate an exemplary case where light is emitted from a light emitting point 25a of each point-like light emitter 25 radially around the light guide direction. Light is emitted as a conically-spreading light flux LF from a light emitting point 25a, as shown by the dotted lines in FIGS. 6(a) through 6(c). FIGS. 6(a) through 6(c) show the same path of light as viewed in the front direction, in the second direction (the arrangement direction of the unit shaped elements) and in the first direction (the longitudinal direction of the unit shaped elements), respectively. For easy understanding, depiction of the unit shaped elements 50 is omitted from FIGS. 6(a) through 6(c).

Because light is emitted radially as shown in FIGS. 6(a) through 6(c), light L61 which can directly enter the light exit surface 31 of the light guide plate 30 (or the light exit-side surface 41 of the body portion 40 as illustrated in the Figures) just near the light entrance surface 33 or 34 of the light guide plate 30 (i.e. light which, after entering the light guide plate 30, can directly enter the light exit surface 31 without being reflected at the back surface 32), little contains a light component along the second direction (i.e. the arrangement direction of the point-like light emitters 25), in other words, little travels in the second direction. On the other hand, of the light flux emitted radially from a point-like light emitter 25, light L63 which contains a considerably larger amount of a component along the second direction, in other words, travels considerably more in the second direction, contains a less amount of a component along the first direction. Accordingly, the light L63 can directly enter the light exit surface 31 of the light guide plate 30 (or the light exit-side surface 41 of the body portion 40 as illustrated in the Figures) at a position P3 remote from the light entrance surface 33 or 34.

Thus, as shown in FIG. 6(a), light emitted radially from a point-like light emitter 25 can directly enter an area A1 (hereinafter also referred to as "bright area") which, when viewed in the front direction, is surrounded by a curve CL which is closest to the point-like light emitter 25 at a position P1 which faces the point-like light emitter 25 in the first direction. In particular, when light emitted by a point-like light emitter travels radially around the light guide direction (the first direction) as is common with a commercially available edge-light type surface light source device, the radial light flux LF can directly enter a bright area A1 which is surrounded by a parabola CL which is extremal at a position P1, the point closest to the point-like light emitter 25 in the first direction.

Accordingly, light which has been emitted by a point-like light emitter 25 that emits light radially and which has entered the light guide plate 30 will not directly reach, without reflection e.g. at the back surface, an area A2 (hereinafter also referred to as "dark area") of the light exit surface 31, which lies in the vicinity of the light entrance surface 33 or 34 of the light guide plate 30 and extends along the light guide direction (the first direction) and between adjacent bright areas A1. The amount of light exiting a dark area A2 is significantly lower than the amount of light exiting an adjacent bright area A1 where light, which has been emitted by a point-like light emitter 25 that emits light radially and which has entered the light guide plate 30, can directly reach.

This may be the reason why a pattern of alternating bright and dark portions is produced at the same pitch as the arrangement pitch of the point-like light emitters 25 along the arrangement direction of the point-like light emitters 25 in an area of the light exit surface 31, lying in the vicinity of the light entrance surface 33 or 34 that faces the light source consisting of the point-like light emitters 25.

When light which little contains a second-direction component (e.g. light L61 shown in FIGS. 6(a) through 6(c)) enters a light exit surface having a relatively large light exit surface angle, in particular a light exit surface angle of about 45° which can exert an excellent light condensing effect through refraction of light, the light repeats total reflection, such as retroreflection, and comes to travel toward the back surface (see light L51 shown in FIG. 5). Thus, the light L51 travels in the first direction without a significant change in the second-direction component. Therefore, the light L51 which has entered a bright area A1 will not diffuse in the second direction. The movement of the light L51, which has entered the bright area A1, toward an adjacent dark area A2 is thus restricted.

Even light that travels in a direction slightly inclined from the first direction (light guide direction) (e.g. light L62 shown in FIGS. 6(a) through 6(c)) is likewise prevented from moving in the second direction by reflection at a light exit surface having a light exit surface angle of about 45°. This is considered as the reason why the in-plane variation of luminance along the arrangement direction of point-like emitters (the second direction) is produced in a wider area when a light guide plate is used which has unit prisms having a relatively large light exit surface angle for the purpose of condensing light.

It is expected that as the emission intensity of LED increases in the future, a decreased number of LEDs will be arranged with a wider spacing in a light source in order to reduce the cost of a display device. It is, therefore, possible that the above-described in-plane variation of luminance may be observed more clearly in a wider area in the vicinity of a light source.

As described above, according to this embodiment, the light exit surface angle θa1, which is the angle of the light exit-side surface 51 of each unit shaped element 50 or a tangent to the light exit-side surface 51 with respect to the one-side surface 41 of the body portion 40 in the main cross-section of the light guide plate 30, is more than 10° and not more than 30° in a zone (first zone Z1) of the contour 51 of each unit shaped element 50, the width of the zone along the arrangement direction of the unit shaped elements 50 (the second direction) being not less than 35% and not more than 70% of the full width W of the unit shaped element 50, i.e. in the first zone Z1 which, when viewed in the front direction, accounts for not less than 35% and not more than 70% of the full width W of the unit shaped element 50. It has been found through the present inventors' studies that as shown in FIG. 5, the light exit-side surface 51 of the unit shaped element 50, having a relatively small light exit surface angle θa, can effectively diffuse in the second direction light 52 which, of light that has been emitted by a point-like light emitter 25 and entered the light guide plate 30 through the light entrance surface 33, little contains a second-direction component and contains a considerable proportion of a component traveling along a direction parallel to the front direction nd and which directly enters the light exit surface 31 in the close vicinity of the light entrance surface 33. In particular, it has been found that in-plane variation of luminance in the light exit surface 31 in an area lying in the vicinity of the light entrance surface 33 can be obscured to a visually unobservable extent by making the light exit surface angle θa more than 10° and not more than 30° in the first zone Z1 whose width along the arrangement direction of the unit shaped elements 50 is not less than 35% and not more than 70% of the full width W of the unit shaped element 50.

Further, in this embodiment, the light exit surface angle θa2 is more than 30° and not more than 60° in a zone (second zone Z2) of the contour 51 of each unit shaped element 50, the width of the zone along the arrangement direction of the unit shaped elements 50 (the second direction) being not less than 30% and not more than 65% of the full width W of the unit shaped element 50. It has been found through the present inventors' studies that such a light guide plate 30 can exert an excellent light condensing effect along the arrangement direction of the unit shaped elements 50 (the second direction) even though the unit shaped elements 50 each have an area of the light exit-side surface 51 (light exit surface 31), having a light exit surface angle θa of more than 10° and not more than 30°. In particular, on the premise of the use of the display device 10 as a home television, the unit shaped elements 50 of the light guide plate 30 have proved to be capable of exerting a light condensing effect to such an extent that there is no need to incorporate a separate light condensing sheet into the surface light source device 20 in order to condense a light component along the second direction.

Further, in this embodiment, the light exit surface angle θa is more than 10° and not more than 60° in the entire contour 51 of each unit shaped element 50 in the main cross-section. This can prevent a light component, traveling along the arrangement direction of the unit shaped elements 50 (the second direction), from exiting the light guide pate 30 without being subjected to a condensing action.

In addition, in this embodiment, the light exit surface angle θa of each unit shaped element 50 increases with distance from the top 52a of the contour 51 of the unit shaped element 50, i.e. the farthest point from the body portion 40 toward the end 52b of the contour 51 of the unit shaped element 50, i.e. the nearest point from the body portion 40. Thus, the light exit-side surface 51 of the unit shaped element 50 has a relatively small light exit surface angle θa1 on the top 52a side remote from the body portion 40, whereas the light exit-side surface 51 of the unit shaped element 50 has a relatively large light exit surface angle θa2 on the end 52b side close to the body portion 40. In particular, according to this embodiment, the first inclined surfaces 37a, 38a of the light exit-side surface 51 (light exit surface 31), which have a light exit surface angle θa of more than 10° and not more than 30° and can exert an excellent diffusing effect on a second-direction light component, are formed in the first zone Z1 including the top 52a of the unit shaped element 50. Further, the second inclined surfaces 37b, 38b of the light exit-side surface 51 (light exit surface 31), which have a light exit surface angle θa of more than 30° and not more than 60°, can more effectively restrict the traveling of light in the second direction and can very effectively exert a light condensing effect on a second-direction light component, are formed in the second zone Z2 including the ends 52b of the unit shaped element 50.

Light which contains a considerable amount of a component along the second direction (e.g. lights L41, L42 shown in FIG. 4) naturally is likely to enter an end 52b-side area of the light exit-side surface 51 of a unit shaped element 50, lying close to the body portion 40. On the other hand, light which contains only a small amount of a component along the second direction (e.g. lights L51, L52 shown in FIG. 5) approximately evenly enters the entire area of the light exit-side surface 51 of a unit shaped element 50. Therefore, compared to light which enters an end 52b-containing area of the light exit-side surface 51 of a unit shaped element 50, lying close to the body portion 40, light which enters a top 52a-containing area of the light exit-side surface 51 of a unit shaped element 50, lying remote from the body portion 40, contains a higher proportion of light having a small amount of a second-direction component. Accordingly, an area of the light exit-side surface 51 of a unit shaped element 50, having a light exit surface angle θa of more than 10° and not more than 30°, selectively exerts a diffusing effect on light having a small amount of a second-direction component. This can effectively obscure variation of brightness in an area of the light exit surface 31, lying in the vicinity of the light entrance surface 33 or 34.

Variation of brightness in the vicinity of the light entrance surfaces 33, 34 can be obscured effectively by thus providing an area of the light exit-side surface 51, having a light exit surface angle θa of more than 10° and not more than 30°, at a position remote from the body portion 40. Therefore, when an area of the light exit-side surface 51, having a light exit surface angle θa of more than 10° and not more than 30°, is provided at a position remote from the body portion 40, as compared to the case of proving such area close to the body portion 40, the proportion of such area (corresponding to the first zone Z1) having such a light exit surface angle θa in the entire light exit-side surface 51 of each unit shaped element 50 can be made smaller while ensuring the same effect of obscuring variation of luminance in the vicinity of the light entrance surfaces 33, 34. This makes it possible to provide each unit shaped element 50 with a larger area having a light exit surface angle θa of more than 30° and not more than 60°, thereby enabling the light guide plate 30 to exert an excellent light condensing effect on a light component traveling along the second direction.

Brightness is most perceivable by a viewer in the central area of a display surface. Therefore, the front-direction luminance is important especially in the central area of the light exit surface 31, remote from the light entrance surfaces 33, 34. Light which is guided in the light guide plate 30 to the central area of the light exit surface 31, remote from the light entrance surfaces 33, 34, contains a second-direction component in a larger amount as compared to light which exits the light exit surface 31 in the vicinity of the light entrance surfaces 33, 34. Accordingly, in the central area of the light exit surface 31, remote from the light entrance surfaces 33, 34, light mostly exits through the end 52b-containing area (corresponding to the second zone Z2) of the light exit-side surface 51 of each unit shaped element 50, lying close to the body portion 40, i.e. the area which can exert an excellent light condensing effect.

As described above, light that reaches an area of the light exit-side surface 51 around the top 52a of each unit shaped element 50 generally contains a relatively small amount of a second-direction component (e.g. light L52 shown in FIG. 5). There is no need to exert a large light condensing effect on such light containing a small amount of a second-direction component. Thus, the provision of an area, having a light exit surface angle θa of not more than 30°, around the top 52a of each unit optical element 52a does not have a significant adverse effect on the light condensing function of the unit shaped elements 50.

As will be appreciated from the above, by proving the area (first inclined surfaces 37a, 38a) of the light exit-side surface 51, having a light exit surface angle θa of more than 10° and not more than 30° and having a relatively low light condensing function, in a position remote from the body portion 40, it becomes possible to effectively reduce the lowering of the overall light condensing effect of the unit shaped elements 50 due to the provision of the area (first inclined surfaces 37a, 38a), thereby avoiding a significant decrease in the front-direction luminance to a visible extent. By thus increasing the light exit surface angle θa of each unit shaped element 50 with distance from the top 52a of the contour 51 of the unit shaped element 50, it become possible to obscure variation of brightness in the vicinity of the light entrance surfaces 33, 34 and, in addition, effectively increase the front-direction luminance in the central area remote from the light entrance surfaces 33, 34.

Various changes and modifications may be made to the above-described embodiment. Some variations will now be described with reference to the drawings. In the drawings referred to in the following description, the same reference numerals are used for the same members or elements as used in the above-described embodiment, and a duplicate description thereof will be omitted.

Figure 7:
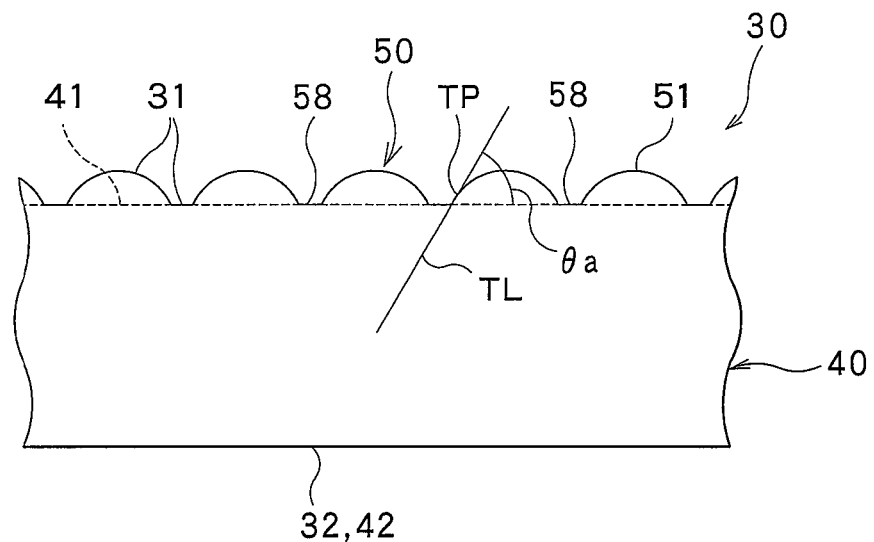
FIG. 7 is a diagram illustrating a variation of the light guide plate in the same cross-section as FIG. 4.
Figure 8:
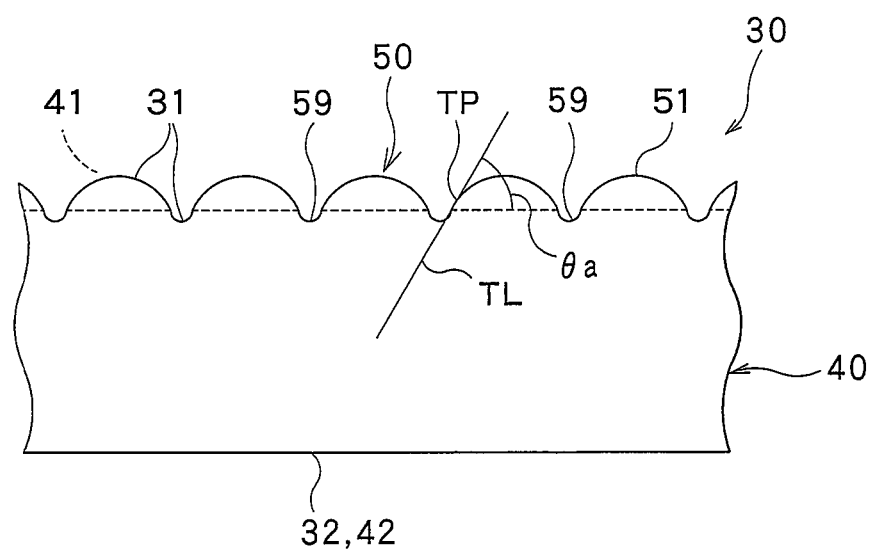
FIG. 8 is a diagram illustrating another variation of the light guide plate in the same cross-section as FIG. 4.

The above-described construction of the unit shaped elements 50 of the light guide plate 30 is merely an example. For example, the contour 51 of each unit shaped element 50 in the main cross-section of the light guide plate may contain a curved line. As described previously, when the contour 51 of each unit shaped element 50 in the main cross-section of the light guide plate has a curved shape, the light exit surface angle θa refers to the angle formed between a tangent TL to the contour 51 of a unit shaped element 50 and the one-side surface 41 of the body portion 40, more precisely the smaller one (minor angle) of the two angles formed, as shown in FIGS. 7 and 8. The unit shaped elements 50 preferably have the above-described features also in this variation. Thus, when the tangent point TP of a tangent TL to the contour 51 of each unit shaped element 50 lies in a zone whose width in a direction parallel to the one-side surface 41 of the body portion 40 accounts for not less than 35% and not more than 70% of the full width W of the unit shaped element 50, the light exit surface angle θa is preferably more than 10° and not more than 30°. Such unit shaped elements 50 can effectively diffuse in the second direction light which directly enters the light exit surface 31 in the close vicinity of the light entrance surface 33 and can obscure the in-plane variation of luminance in an area of the light exit surface 31, lying in the vicinity of the light entrance surface 33.

Though in the above-described embodiment the unit shaped elements 50 of the light guide plate 30 are arranged without any space between two adjacent unit shaped elements 50, it is possible to provide a flat portion 58 between two adjacent unit shaped elements 50, as shown in FIG. 7, or to provide a recessed portion 59 between two adjacent unit shaped elements 50, as shown in FIG. 8.

Figure 10:
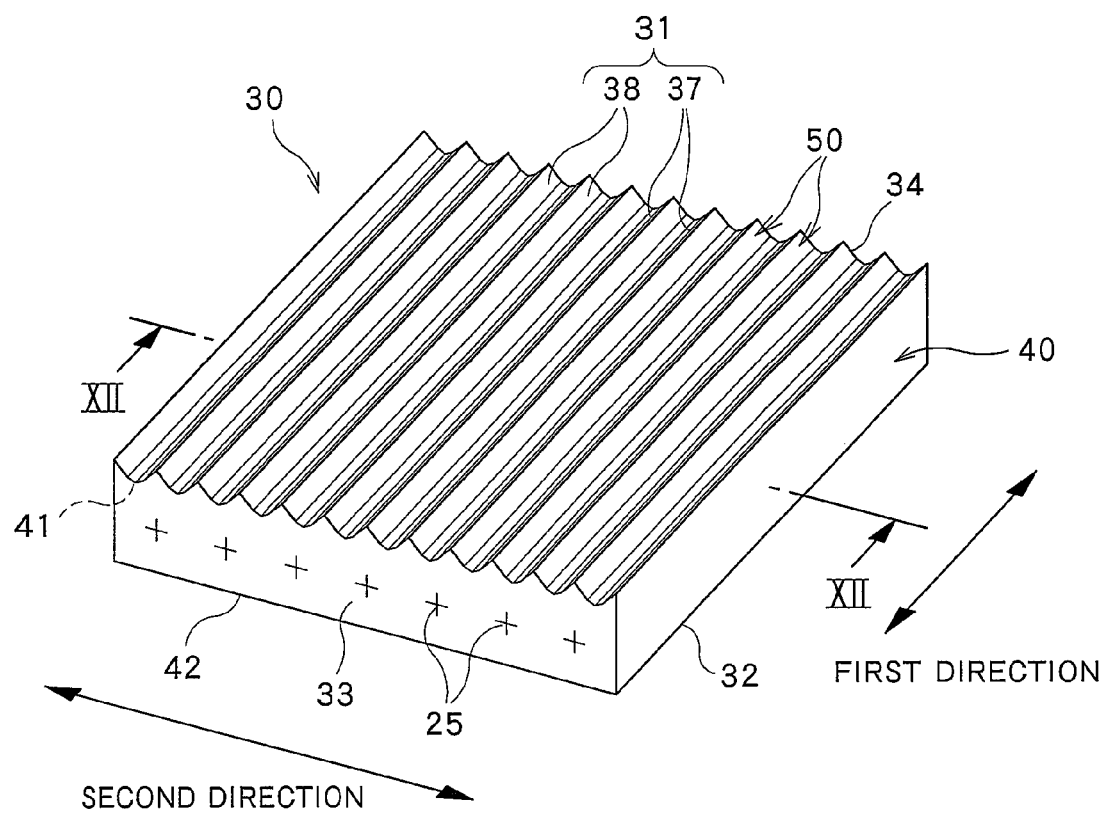
FIG. 10 is a diagram corresponding to FIG. 3, illustrating yet another variation of the light guide plate.
Figure 11:
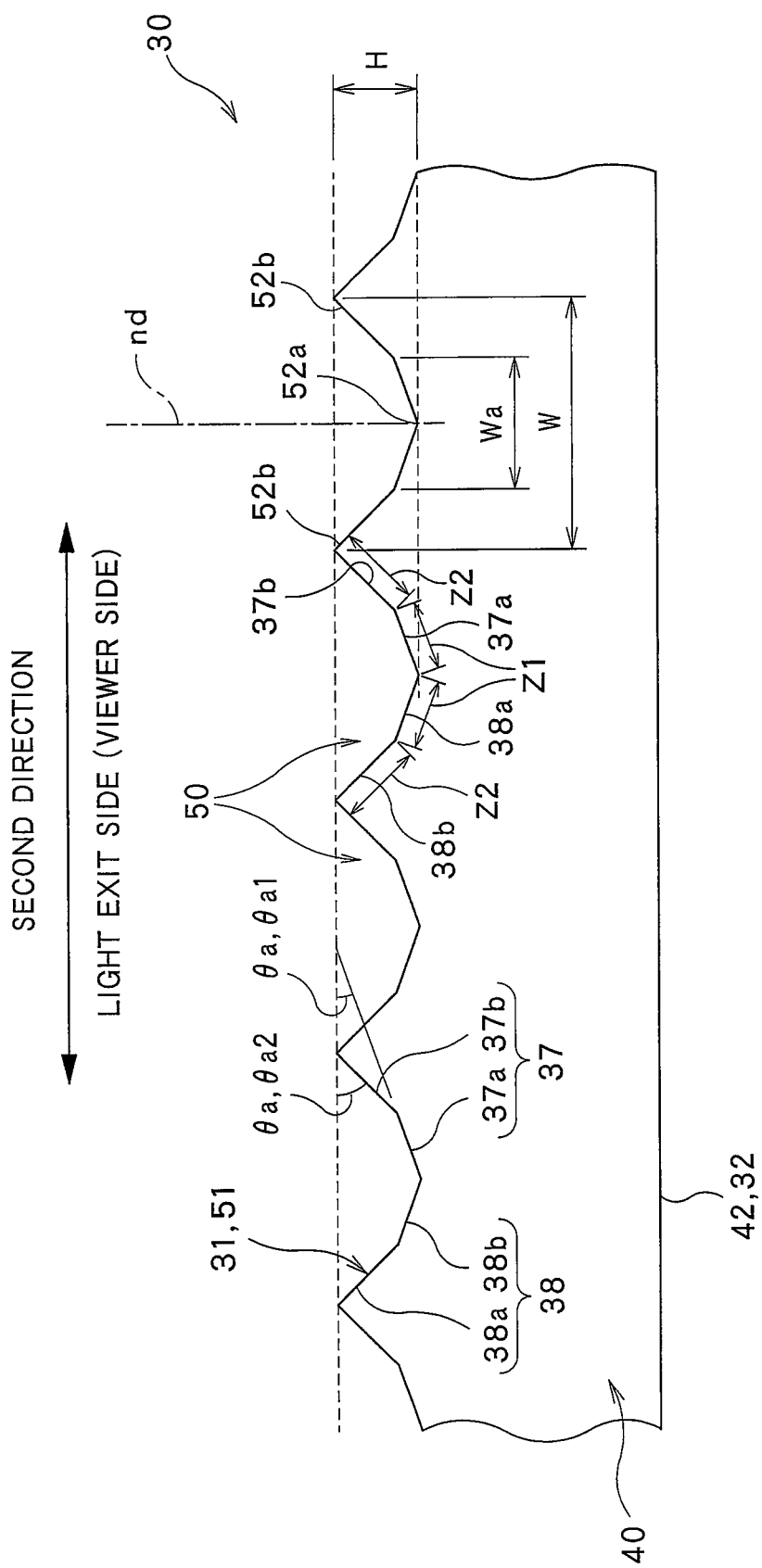
FIG. 11 is a diagram corresponding to FIG. 4, showing the light guide plate in the cross-section along the line XII-XII of FIG. 10.
Figure 12:
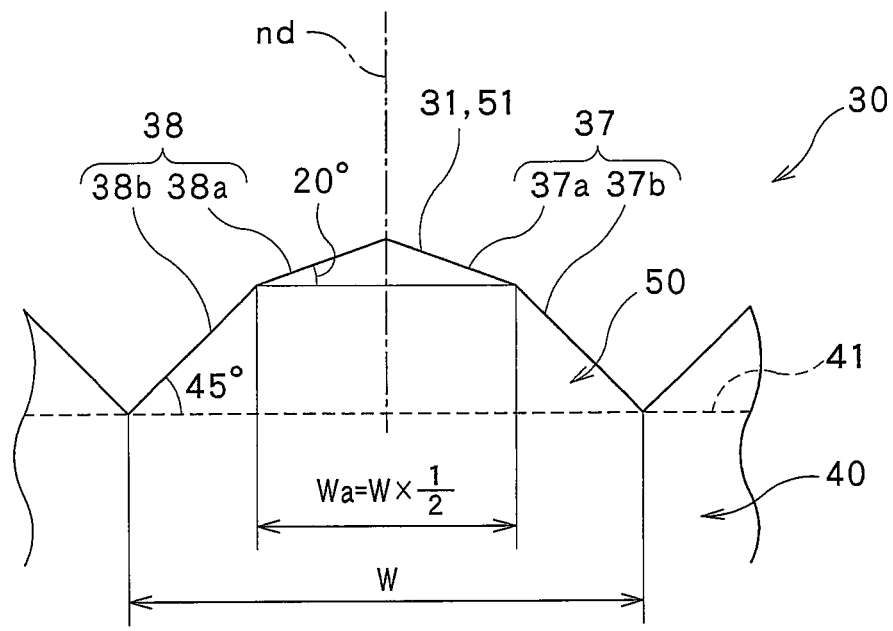
FIG. 12 is a diagram showing the cross-sectional shape of a unit shaped element in the main cross-section of the light guide plate of Example 1.
Figure 13:
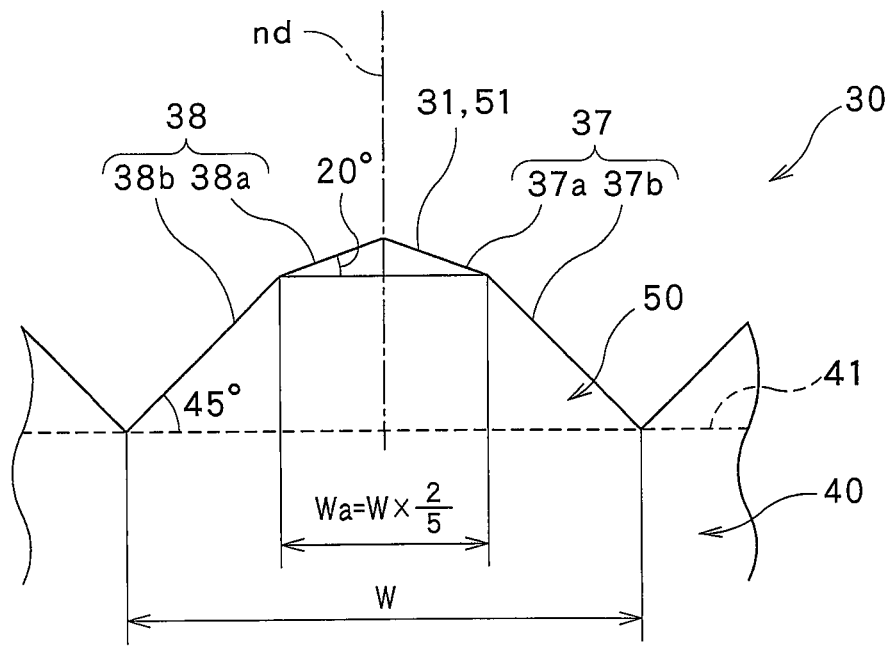
FIG. 13 is a diagram showing the cross-sectional shape of a unit shaped element in the main cross-section of the light guide plate of Example 2.
Figure 14:
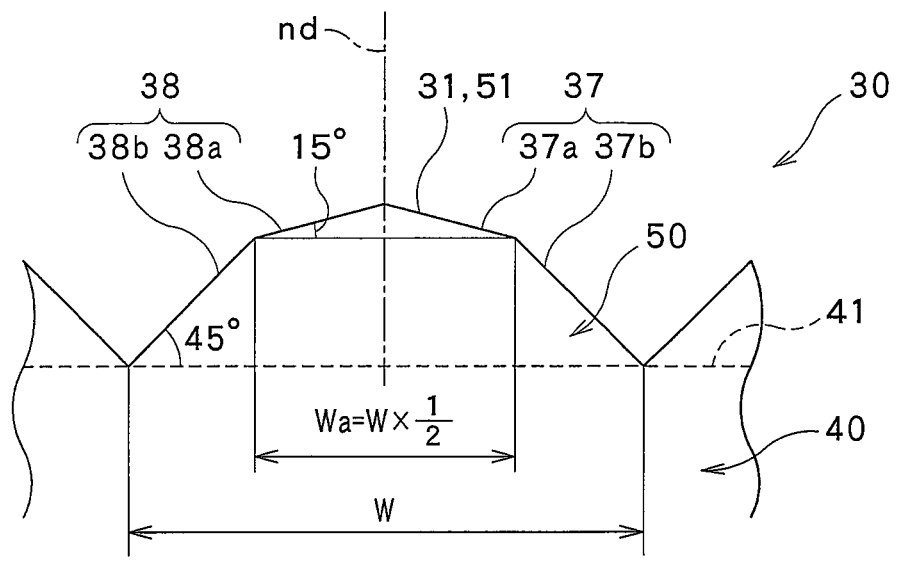
FIG. 14 is a diagram showing the cross-sectional shape of a unit shaped element in the main cross-section of the light guide plate of Example 3.
Figure 15:
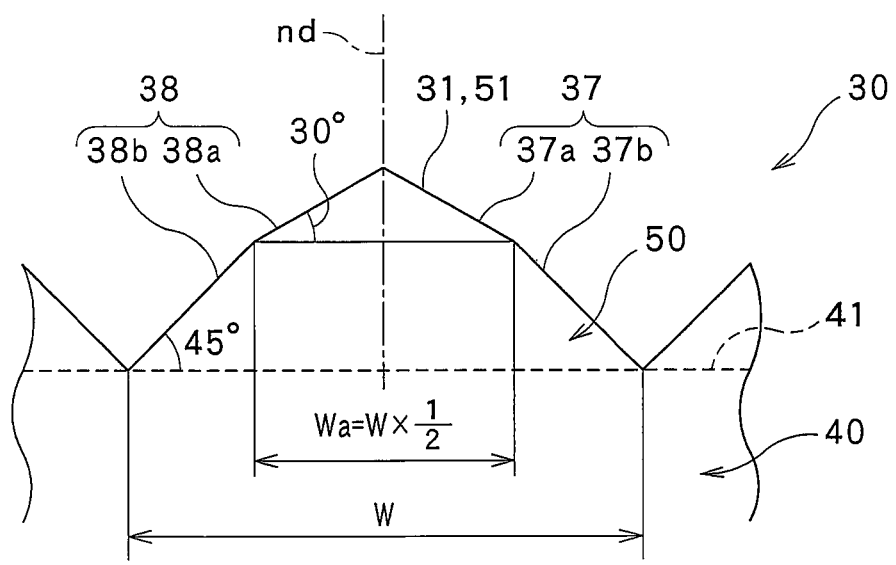
FIG. 15 is a diagram showing the cross-sectional shape of a unit shaped element in the main cross-section of the light guide plate of Example 4.
Figure 16:
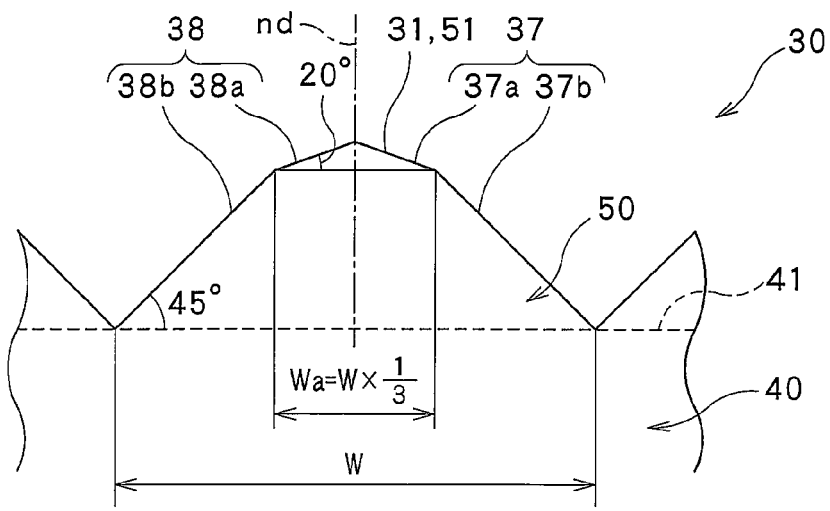
FIG. 16 is a diagram showing the cross-sectional shape of a unit shaped element in the main cross-section of the light guide plate of Comp. Example 1.
Figure 17:
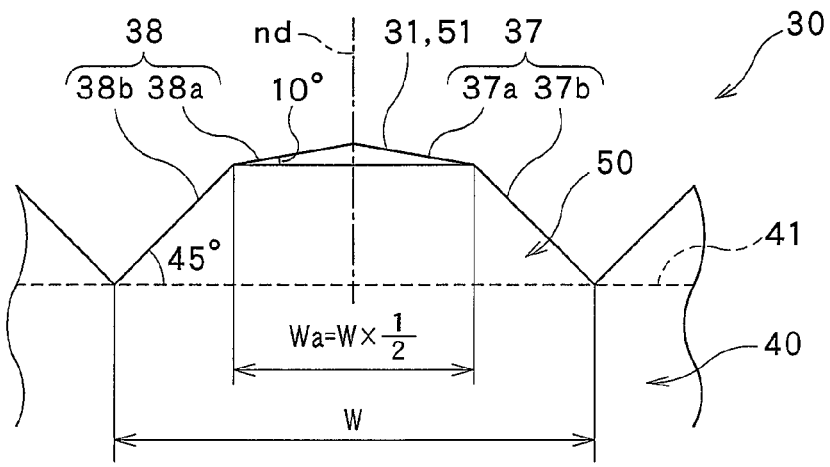
FIG. 17 is a diagram showing the cross-sectional shape of a unit shaped element in the main cross-section of the light guide plate of Comp. Example 2.
Figure 18:
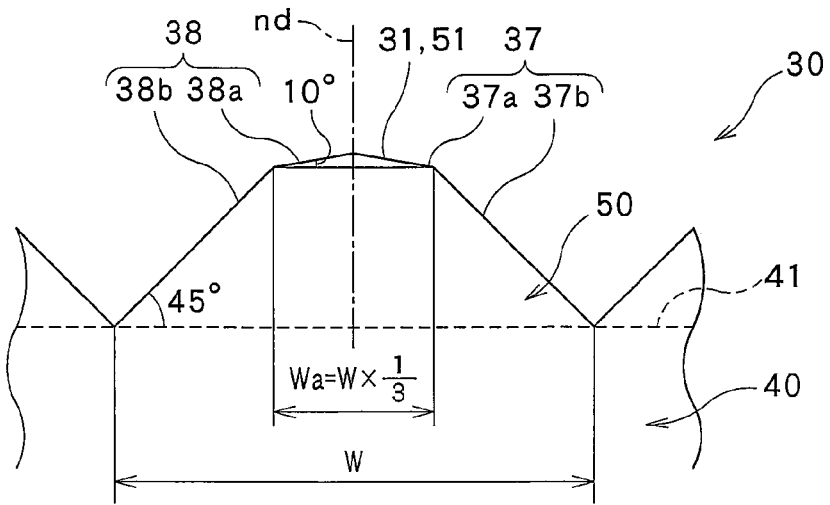
FIG. 18 is a diagram showing the cross-sectional shape of a unit shaped element in the main cross-section of the light guide plate of Comp. Example 3.
Figure 19:
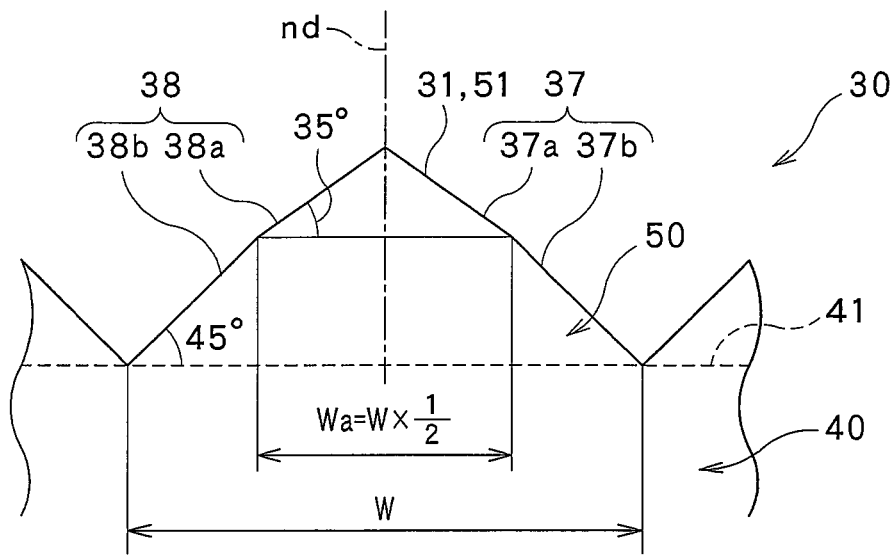
FIG. 19 is a diagram showing the cross-sectional shape of a unit shaped element in the main cross-section of the light guide plate of Comp. Example 4.
Figure 20:
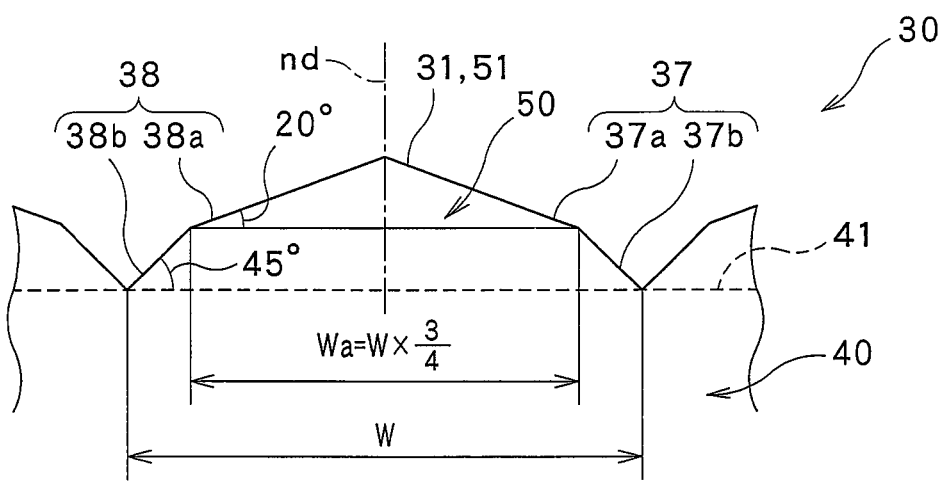
FIG. 20 is a diagram showing the cross-sectional shape of a unit shaped element in the main cross-section of the light guide plate of Comp. Example 5.

In the above-described embodiment, the light exit surface 31 of the light guide plate 30 is composed of the inclined surfaces 37a, 37b, 38a, 38b which are inclined with respect to the plate plane of the light guide plate 30 and provided by the unit shaped elements 50 formed on the one-side surface 41 of the body portion 40. However, as shown in FIGS. 10 and 11, it is also possible to provide a light guide plate 30 with inclined surfaces 37a, 37b, 38a, 38b by forming grooves, having the shape of the inverted unit shaped elements 50, in the one-side surface 41 of the body portion 40. Thus, in this example, the grooves serve as unit shaped elements 50 which exert an optical effect on light. More specifically, the light guide plate 30 consists of the body portion 40 and the grooves 50 formed in the one-side surface 41 of the body portion 40 and arranged in an arrangement direction intersecting the first direction, each groove extending in a direction intersecting the arrangement direction. The light guide plate 30 can be produced by shaping using a mold with a three-dimensional pattern, having the same configuration as the light exit surface 31 of the above-described light guide plate 30, formed in the mold surface. The above-described constructional features of the unit shaped elements of the preceding embodiment can be applied to the grooves of this example as unit shaped elements. The inclined surfaces 37a,37b, 38a, 38b, i.e. the light exit-side surfaces (wall surfaces) of the grooves, can exert the same optical effects as those described above with reference to the preceding embodiment.

In the example shown in FIGS. 10 and 11, the groove-shaped unit shaped elements 50 are shaped complementarily to the above-described generally columnar unit shaped elements. In FIGS. 10 and 11, the same reference numerals are used for parts or portions corresponding to those of the above-described embodiment.

In the example shown in FIGS. 10 and 11, in the main cross-section parallel to both the normal direction of the one-side surface 41 of the body portion 40 and the arrangement direction of the unit shaped elements 50, the light exit surface angle θa, which is the angle of the contour (wall surface) 51 of each unit shaped element (groove) 50 with respect to the one-side surface 41 of the body portion 40, is more than 10° and not more than 30° in a zone (first zone Z1) of the contour 51 of each unit shaped element 50, the width of the zone along the arrangement direction of the unit shaped elements 50 (the second direction) being not less than 35% and not more than 70% of the full width W of the unit shaped element 50. In addition, in the example shown in FIGS. 10 and 11, the light exit surface angle θa of each unit shaped element 50 increases with distance from the top (deepest point) 52a of the contour 51 of the unit shaped element 50, i.e. the farthest point from the one-side surface 41 of the body portion 40 toward the end (proximal end) 52b of the contour 51 of the unit shaped element 50, i.e. the nearest point from the one-side surface 41 of the body portion 40.

Further, also in this example in which the unit shaped elements 50 are configured as grooves, it is preferred that the light exit surface angle θa be more than 30° and not more than 60° in a zone (second zone Z2) of the contour 51 of each unit shaped element 50, the width of the zone along the arrangement direction of the unit shaped elements 50 (the second direction) being not less than 30% and not more than 65% of the full width W of the unit shaped element 50. Furthermore, it is preferred that the light exit surface angle θa be more than 10° and not more than 60° in the entire contour 51 of each unit shaped element 50 in the main cross-section. Furthermore, also in this example in which the unit shaped elements 50 are configured as grooves, in the main cross-section of the light guide plate 30, the ratio of the height (depth) H of each unit shaped element 50 from the one-side surface 41 of the body portion 40 relative to the width W of the unit shaped element 50 in the arrangement direction (H/W) is preferably not less than 0.2 and not more than 0.4.

In the example shown in FIGS. 10 and 11, the groove-shaped unit shaped elements 50 are formed, with no space between adjacent elements 50, in the one-side surface 41 of the body portion 40. Thus, in the illustrated example, the one-side surface 41 of the body portion 40 is a virtual surface defined by the ends (base ends) 52b of the unit shaped elements 50.

Though in the above described embodiments each unit shaped element 50 has a constant cross-sectional shape in the longitudinal direction, it is also possible to use a unit shaped element 50 whose cross-sectional shape changes along the longitudinal direction.

Figure 9:
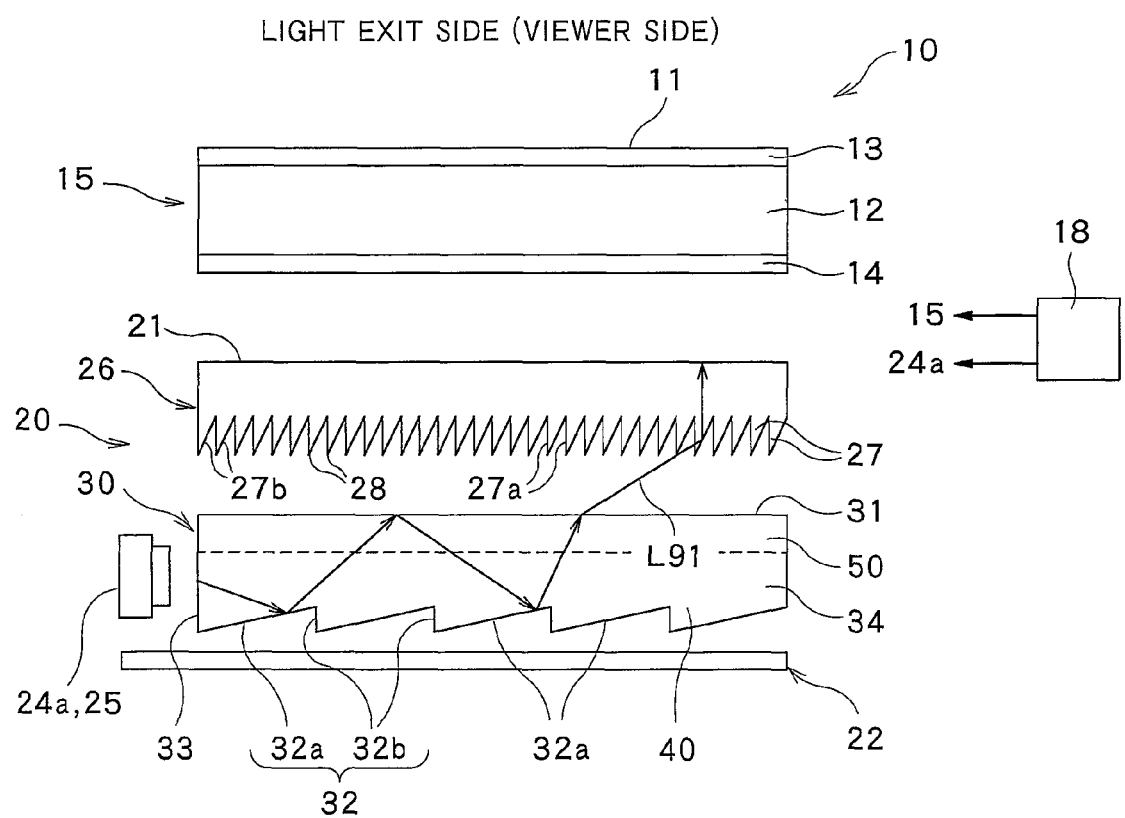
FIG. 9 is a diagram corresponding to FIG. 1, showing a variation of the surface light source device.

Though in the above-described embodiment the two opposing side surfaces 33, 34 of the light guide plate 30 serve as the light entrance surfaces, it is possible to design the surface light source device such that only one side surface 33 of the light guide plate 30 serves as a light entrance surface as in the variation shown in FIG. 9. According to this variation, in the cross-section parallel to both the first direction and the normal direction nd of the light emitting surface 21 of the surface light source device 20, light exits the light guide plate 30 generally in a direction inclined from the front direction nd toward one side in the light guide direction. Therefore, the unit prisms 27 of the optical sheet 26 need not have a symmetrical shape in the cross-section parallel to both the first direction and the normal direction nd of the light emitting surface 21 of the surface light source device 20. In the variation shown in FIG. 9, each unit prism 27 has a transmissive surface 27a which transmits light from the light guide plate 30, and a reflective surface 27b which totally reflects light that has entered the optical sheet 26 through the transmissive surface 27a. The reflective surface 27b is inclined with respect to the front direction nd, whereas the transmissive surface 27a extends approximately parallel to the front direction nd.

Though in the above-described embodiment the diffusing component 45 is dispersed in the body portion 40 so that light that has entered the light guide plate 30 can exit the light guide plate 30, some other method may be used to cause light to exit the light guide plate 30. For example, it is possible to incline the light exit surface 31 and the back surface 32 of the light guide plate 30 with respect to each other as shown in FIG. 9. In the example shown in FIG. 9, the back surface 32 consists of a plurality of inclined surfaces 32a, and step surfaces 32b each connecting two adjacent inclined surfaces 32a. Each inclined surface 32a is inclined such that the distance to the light exit surface 31 decreases with distance from the light entrance surface 33. Each step surface 32b extends in the normal direction nd of the plate plane of the light guide plate 30. Therefore, most of light, traveling in the light guide plate 30 from the light entrance surface 33 toward the counter surface 34, reflects at an inclined surface(s) 32a without entering a step surface 32b. As shown in FIG. 9, when light L91 travels in the light guide plate 30 while reflecting at the light exit surface 31 and at the back surface 32, the incident angle of the light L91 at the light exit surface 31 or the back surface 32 decreases every time the light reflects at the back surface 32, and becomes less than the critical angle for total reflection after repeating total reflection. Accordingly, despite the absence of a light diffusing component in the body portion 40, the light L91 traveling in the light guide plate 30 can exit the light guide plate 30 at a position remote from the light entrance surface 33. The amount of light exiting the light guide plate 30 can thus be made uniform along the first direction.

Instead of or in addition to the above-described method(s) to cause light to exit the light guide plate 30, i.e. the method of dispersing the diffusing component 45 in the body portion 40 as in the above-described embodiment and/or the method of inclining the light exit surface 31 and the back surface 32 with respect to each other as shown in FIG. 9, it is possible to use some other method to take light out of the light guide plate 30. Examples may include a method of roughening at least one of the light exit surface 31 and the back surface 32, a method of providing a pattern of white scattering layer on the back surface 32, etc. Though in the embodiment shown in FIG. 9, the back surface 32 consists of the inclined surfaces 32a and the step surfaces 32b, it is possible to eliminate the step surfaces 32b, and to construct the back surface 32 as a continuous flat inclined surface or as a continuous curved surface.

The above-described optical sheet 26, disposed on the light exit side of the light guide plate 30, is merely an example. It is possible to use various other types of optical sheets instead of the above-described optical sheet 26. For example, it is possible to use an optical sheet having unit prisms on the light exit side. It is also possible to use an optical sheet having unit prisms, each having a cross-sectional shape other than a triangle, for example, a polygon other than a triangle, a part of an ellipse, etc.

The above-described constructions of the surface light source device 20 and the display device 10 are merely examples and are capable of various modifications. For example, a light diffusion sheet which functions to diffuse transmitted light, a polarization separation film which functions to transmit only a particular polarization component and reflect the other polarization component, etc. may be provided on the light exit side of the optical sheet 26.

The modifications described hereinabove may also be made in an appropriate combination to the above-described embodiments.

EXPERIMENTAL EXAMPLES

The following examples illustrate the present invention in greater detail and are not intended to limit the invention in any manner.

<Surface Light Source Device>

Surface light source devices according to the present invention (Examples 1 to 4) and comparative surface light source devices (Comp. Examples 1 to 7) were prepared. Each surface light source consists of a light guide plate, a light source, a reflective sheet and an optical sheet which are arranged in the same positional relationship as in the above-described embodiment. The surface light source devices of Examples 1 to 4 and Comp. Examples 1 to 7 were the same in the light source, the reflective sheet and the optical sheet, but differed from one another in the cross-sectional shape of the unit shaped elements of the light guide plate as described below.

(Light Guide Plate)

The light guide plate consisted of a body portion and unit shaped elements arranged on one-side surface of the body portion. As in the above-described embodiment, a pair of opposing side surfaces of the light guide plate served as light entrance surfaces. Thus, the below-described light sources were disposed so as to face the pair of side surfaces.

As in the above-describe embodiment, the unit shaped elements were arranged side by side on the one-side surface of the body portion. Each unit shaped element had a constant cross-sectional shape and extends linearly along the first direction connecting the pair of light entrance surfaces. The unit shaped elements were arranged side by side, with no space therebetween, on the one-side surface of the body portion along the second direction perpendicular to the first direction. The unit shaped elements were produced by curing an ultraviolet curable acrylic resin. Simultaneously with the production of the unit shaped elements, a land portion having a constant thickness was formed between the unit shaped elements and a substrate, constituting the body portion, by curing the same ultraviolet curable acrylic resin.

The body portion, on the other hand, was composed of the land portion and a plate-like material which had been used as the substrate upon the formation of the land portion and the unit shaped elements. The body portion had a flat plate-like shape having a constant thickness, with the back surface and the light exit surface being parallel to each other. The plate-like material or the substrate included polymethyl methacrylate (PMMA) and a light scattering agent as a diffusing component.

The cross-sectional shape of each unit shaped element in the main cross-section was varied among the surface light source devices of Examples 1 to 4 and Comp. Examples 1 to 7 as shown in Table 1 and FIGS. 12 through 22. In all the light guide plates used in the surface light source devices, the cross-sectional shape of each unit shaped element was symmetrical with respect to the front direction. Further, in all the light guide plates, the width W of each unit shaped element in the main cross-section was 100 µm. In FIGS. 12 through 22 were used the same reference numerals as used in the above-described FIGS. 1 through 11.

As shown in FIGS. 12 through 20, in the light guide plates used in the surface light source devices of Examples 1 to 4 and Comp. Examples 1 to 5, each unit shaped element had a pentagonal shape in the main cross-section as in the above-described embodiment. Further, as in the above-described embodiment, the bent surfaces of each unit shaped element consisted of gentle slopes (37a, 37b) lying on the top side, and steep slopes (38a, 38b) lying on the end sides in the main cross-section and having a larger light exit surface angle than the gentle slopes. Table 1 and FIGS. 12 through 20 show data on the light exit surface angles of the gentle slopes and the steep slopes (the rows headed "light exit surface angle") and data on the proportion of the width of the gentle slopes or the steep slopes in the full width of each unit shaped element in the arrangement direction of the unit shaped elements (the rows headed "width-direction occupancy") for the unit shaped elements of the light guide plates used in the surface light source devices of Examples 1 to 4 and Comp. Examples 1 to 5.

Figure 21:
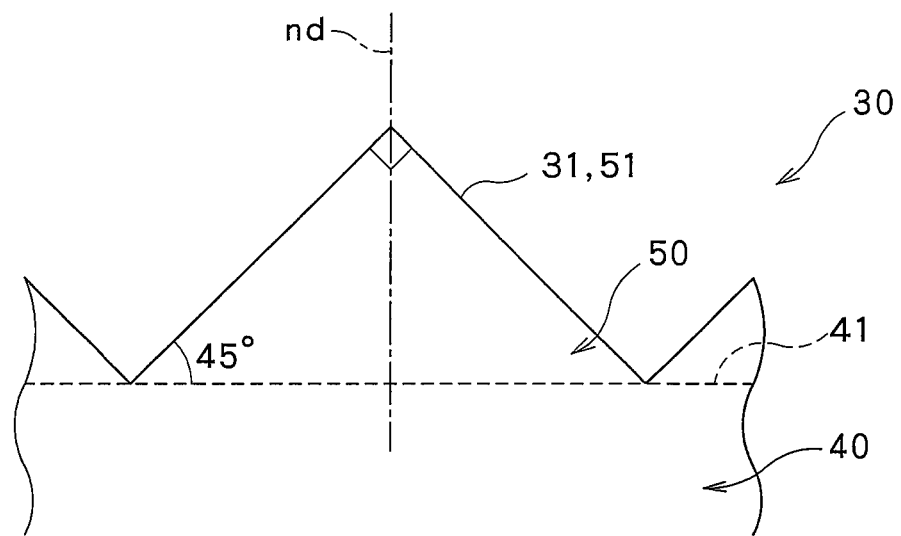
FIG. 21 is a diagram showing the cross-sectional shape of a unit shaped element in the main cross-section of the light guide plate of Comp. Example 6.
Figure 22:
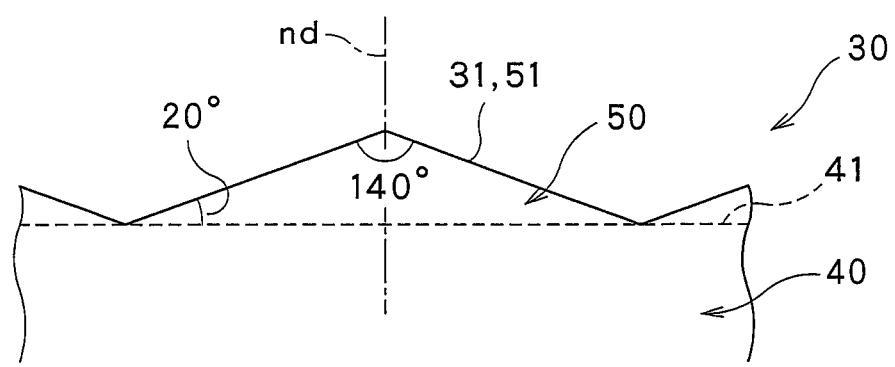
FIG. 22 is a diagram showing the cross-sectional shape of a unit shaped element in the main cross-section of the light guide plate of Comp. Example 7.

On the other hand, as shown in FIGS. 21 and 22, in the light guide plates used in the surface light source devices of Comp. Examples 6 and 7, the cross-sectional shape of each unit shaped element in the main cross-section was an isosceles triangle. With reference to the light guide plate of the surface light source device of Comp. Examples 6, the cross-sectional shape of each unit shaped element was an isosceles triangle whose apex angle at the top is 90°. Thus, the unit shaped element had a constant light exit surface angle of 45°. With reference to the light guide plate of the surface light source device of Comp. Examples 7, the cross-sectional shape of each unit shaped element was an isosceles triangle whose apex angle at the top is 140°. Thus, the unit shaped element had a constant light exit surface angle of 20°.

(Light Source)

A light source was constructed by arranging a large number of IED chips, each having a size of 1.6 mm×0.8 mm, at a pitch of 2.0 mm in the longitudinal direction of each light entrance surface (the above-described second direction) of the light guide plate such that the 0.8-mm side of each LED chip was parallel to the thickness direction of the light guide plate. The light source was disposed so as to face each of the two opposing light entrance surfaces of the light guide plate. The two light sources were disposed such that a 0.8-mm gap was formed between each light source and the corresponding light entrance surface of the light guide plate.

(Reflective Sheet)

A white 250-µm thick polyester film as a reflective sheet was disposed so as to face the back surface of the light guide plate.

(Optical Sheet)

A so-called prism sheet as an optical sheet was disposed so as to face the light exit surface of the light guide plate. The optical sheet (prism sheet) included a 125-μm thick polyester film, and unit prisms formed from an ultraviolet curable acrylic resin. Each unit prism had an isosceles triangle shape with an apex angle of 65° at the top in a cross-section perpendicular to the longitudinal direction. As with the optical sheet of the above-described embodiment, the optical sheet was disposed such that the unit prisms project toward the light guide plate and that the arrangement direction of the unit prisms was parallel to the light guide direction of the light guide plate (the first direction).

<Evaluation Method>

Each surface light source device with the light sources lighting was observed visually at a distance of 1 m from the light emitting surface of the surface light source device along the normal direction of said light emitting surface to check whether variation of brightness, i.e. a pattern of alternating bright and dark portions, was observed in an area of the light emitting surface of the surface light source device, lying in the vicinity of each light entrance surface. The observation results are shown in Table 1. In Table 1, the symbol "X" in the row headed "visual determination" indicates that a clear pattern of alternate bright and dark portions was observed, "Δ" indicates a dull pattern of alternate bright and dark portions was observed, and "O" indicates no pattern of alternate bright and dark portions was observed.

Furthermore, measurement of the front-direction luminance was conducted for each surface light source device, using a luminance meter BM-7, manufactured by Topcon Corporation. The results of the measurement are shown in Table 1 in terms of the relative luminance (percent) among the surface light source devices tested.

TABLE 1

| | | | | | | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|---|---|
| | | | Ex. 1 | Ex. 2 | Ex. 3 | Ex. 4 | | | | | | | |
| Light guide plate | Shape | | FIG. 12 | FIG. 13 | FIG. 14 | FIG. 15 | FIG. 16 | FIG. 17 | FIG. 18 | FIG. 19 | FIG. 20 | FIG. 21 | FIG. 22 |
| | Gentle slopes | Light exit surface angle (degree) | 20 | 20 | 15 | 30 | 20 | 10 | 10 | 35 | 20 | — | 20 |
| | | Width-direction occupancy (%) | 50 | 40 | 50 | 50 | 33.3 | 50 | 33.3 | 50 | 75 | 0 | 100 |
| | Steep slopes | Light exit surface angle (degree) | 45 | 45 | 45 | 45 | 45 | 45 | 45 | 45 | 45 | 45 | — |
| | | Width-direction occupancy (%) | 50 | 60 | 50 | 50 | 66.7 | 50 | 66.7 | 50 | 25 | 100 | 0 |
| Evaluation | Visual determination (variation of luminance) | | O | O | O | O | X | Δ | X | X | X | X | O |
| | Luminance (%) | | 95 | 100 | 95 | 105 | 105 | 95 | 100 | 105 | 65 | 110 | 60 |

What is claimed is:

1. A light guide plate comprising:
a light exit surface;
a back surface opposed to the light exit surface;
at least one light entrance surface consisting of part of a side surface between the light exit surface and the back surface; and
a counter surface consisting of part of the side surface and opposed to the one light entrance surface in a first direction;
said light guide plate further comprising:
a body portion; and
unit shaped elements defining the light exit surface, the unit shaped elements being arranged on one-side surface of the body portion in an arrangement direction intersecting the first direction;
wherein each unit shaped element extends in a direction intersecting the arrangement direction;
wherein in a main cross-section parallel to both the arrangement direction and a normal direction of the one-side surface of the body portion, a light exit surface angle, which is an angle of a contour of each unit shaped element with respect to the one-side surface of the body portion, is more than 10° and not more than 30° in a zone of the contour of each unit shaped element, a width of the zone along the arrangement direction being not less than 35% and not more than 70% of a full width of the unit shaped element;
wherein the unit shaped elements each have, in the main cross-section, a pentagonal shape whose one side lies on the one-side surface of the body portion and whose two sides lie between a top and each end of the contour, or a shape in which one or more of the corners of the polygonal shape are chamfered; and
wherein of said two sides lying between the top, the farthest point from the one-side surface, and each end, connecting to the one-side surface, of the contour, the top-side side has a light exit surface angle of more than 10° and not more than 30°, and the end-side side has a light exit surface angle of more than 30° and not more than 60°.

2. The light guide plate according to claim 1, wherein the light exit surface angle of the unit shaped element increases with distance from a top of the contour of the unit shaped element that is the farthest point from the body portion toward an end of the contour of the unit shaped element that is the nearest point to the body portion.

3. The light guide plate according to claim 1, wherein the light exit surface angle is more than 10° and not more than 60° in the entire contour of the unit shaped element in the main cross-section.

4. The light guide plate according to claim 1, wherein the light exit surface angle is more than 30° and not more than 60° in a zone of the contour of the unit shaped element, the width of the zone along the arrangement direction being not less than 30% and not more than 65% of the full width of the unit shaped element.

5. The light guide plate according to claim 1, wherein in the main cross-section of the light guide plate, a ratio of a height H of each unit shaped element from the one-side surface of the body portion relative to a width W of the unit shaped element in the arrangement direction (H/W) is not less than 0.2 and not more than 0.4.

6. The light guide plate according to claim 1, wherein the body portion has a resin matrix and a diffusing component dispersed in the matrix.

7. A surface light source device comprising:

the light guide plate according to claim 1; and a light source disposed so as to face the light entrance surface of the light guide plate.

8. The surface light source device according to claim 7, wherein the one light entrance surface of the light guide plate serves as a first light entrance surface and the counter surface of the light guide plate serves as a second light entrance surface, and wherein the light source includes a first light source disposed so as to face the first light entrance surface, and a second light source disposed so as to face the second light entrance surface.

9. The surface light source device according to claim 7, wherein the light source includes point-like light emitters arranged so as to face the light entrance surface of the light guide plate.

10. A display device comprising:

the surface light source device according to claim 9;

a liquid crystal display panel disposed so as to face the surface light source device; and a controller for controlling an output of each point-like light emitter, wherein the controller is configured to adjust the output of each point-like light emitter according to an image to be displayed.

11. A display device comprising:

the surface light source device according to claim 7; and a liquid crystal display panel disposed so as to face the surface light source device.

\* \* \* \* \*